US009695898B2

(12) United States Patent
Murakami et al.

(10) Patent No.: US 9,695,898 B2
(45) Date of Patent: Jul. 4, 2017

(54) SHOCK ABSORBER

(71) Applicant: Showa Corporation, Gyoda-shi (JP)

(72) Inventors: Yosuke Murakami, Fukuroi (JP); Kazuhiro Miwa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 143 days.

(21) Appl. No.: 14/667,219

(22) Filed: Mar. 24, 2015

(65) Prior Publication Data

US 2015/0276004 A1    Oct. 1, 2015

(30) Foreign Application Priority Data

Mar. 31, 2014 (JP) .................. 2014-074966
Dec. 22, 2014 (JP) .................. 2014-259303

(51) Int. Cl.
| | | |
|---|---|---|
| *F16F 9/512* | (2006.01) | |
| *F16F 9/18* | (2006.01) | |
| *B62K 25/08* | (2006.01) | |
| *F16F 9/46* | (2006.01) | |

(52) U.S. Cl.
CPC ............ *F16F 9/512* (2013.01); *B62K 25/08* (2013.01); *F16F 9/18* (2013.01); *F16F 9/465* (2013.01)

(58) Field of Classification Search
CPC ... F16F 9/512; F16F 9/465; F16F 9/18; B62K 25/08
USPC .................. 188/313, 314, 318, 282.2–282.6
See application file for complete search history.

(56) References Cited

U.S. PATENT DOCUMENTS

| | | | | |
|---|---|---|---|---|
| 4,826,207 A | * | 5/1989 | Yoshioka ............... | F16F 9/468 188/282.4 |
| 5,044,474 A | * | 9/1991 | de Kock ................. | F16F 9/466 137/614.2 |
| 5,078,240 A | | 1/1992 | Ackermann et al. | |
| 5,094,321 A | * | 3/1992 | Neumann ............... | F16F 9/512 188/282.3 |

(Continued)

FOREIGN PATENT DOCUMENTS

| | | |
|---|---|---|
| DE | 4016807 A | 1/1991 |
| DE | 4137403 A | 5/1993 |

(Continued)

OTHER PUBLICATIONS

Extended European Search Report mailed Sep. 30, 2015 for the corresponding European Application No. 15161259.5.

*Primary Examiner* — Thomas J Williams
*Assistant Examiner* — Mariano Sy
(74) *Attorney, Agent, or Firm* — Leason Ellis LLP

(57) ABSTRACT

A damping force generating apparatus of a shock absorber includes a main flow path through which a working fluid flows, a main valve which generates a damping force by controlling the flow of the working fluid by opening and closing the main flow path, a pilot chamber into which the working fluid branched from the main flow path flows and which applies an internal pressure in a valve closing direction to the main valve by a pressure of the working fluid, and a pilot flow path to which the working fluid flows out from the pilot chamber. In addition, a jet stream which is generated in a flow path narrowed by the main valve in the main flow path joins the flow of the working fluid which flows out from the pilot chamber via the pilot flow path.

16 Claims, 14 Drawing Sheets

(56) References Cited

U.S. PATENT DOCUMENTS

| | | | | |
|---|---|---|---|---|
| 5,129,488 | A * | 7/1992 | Furuya | B60G 17/08 |
| | | | | 188/282.6 |
| 5,368,142 | A * | 11/1994 | Ashiba | F16F 9/468 |
| | | | | 188/266.3 |
| 5,409,090 | A * | 4/1995 | Kashiwagi | F16F 9/468 |
| | | | | 188/266.4 |
| 5,501,307 | A * | 3/1996 | Lars | F16F 9/465 |
| | | | | 188/266.8 |
| 6,119,831 | A * | 9/2000 | Knecht | F16F 9/46 |
| | | | | 188/282.2 |
| 6,981,577 | B2 * | 1/2006 | Katayama | F16F 9/537 |
| | | | | 188/267.1 |
| 7,878,311 | B2 * | 2/2011 | Van Weelden | F16F 9/465 |
| | | | | 137/487.5 |
| 9,074,651 | B2 * | 7/2015 | Bismans | F16F 9/48 |
| 2004/0188200 | A1 * | 9/2004 | Katayama | F16F 9/537 |
| | | | | 188/322.15 |
| 2011/0198172 | A1 | 8/2011 | Whan | |

FOREIGN PATENT DOCUMENTS

| | | |
|---|---|---|
| JP | 62-155242 U | 10/1987 |
| JP | 10-246271 A | 9/1998 |

\* cited by examiner

*Prior Art*

SHOCK ABSORBER

CROSS-REFERENCE TO RELATED APPLICATIONS

This application is based on and claims priority under 35 USC 119 from Japanese Patent Application No. 2014-074966 filed on Mar. 31, 2014, and Japanese Patent Application No. 2014-259303 filed on Dec. 22, 2014, the entire contents of which are incorporated herein by reference.

BACKGROUND OF THE INVENTION

1. Technical Field

The present invention relates to a shock absorber which includes a damping force adjusting apparatus which controls a flow of an internal working fluid generated according to extension and contraction motions and adjusts a damping force.

2. Related Art

For example, a shock absorber which is used as a front fork which suspends a front wheel of a motorcycle to a vehicle body, includes a cylinder in which an oil serving as a working fluid is enclosed, a piston which is slidably fitted into the cylinder, a piston rod which is connected to the piston and extends outside the cylinder, and a damping force adjusting apparatus which controls a flow of oil by sliding of the piston in the cylinder and adjusts the damping force.

In this kind of the hydraulic shock absorber, a damping force adjusting apparatus which largely changes damping force characteristics in a medium-high speed region of a piston speed is known, in which a pilot chamber is formed on a rear portion of a disc valve which selectively opens and closes an oil path provided in the piston, and the pilot chamber communicates with a cylinder chamber in an upstream side of the disc valve via a fixed orifice and communicates with a cylinder chamber in a downstream side of the disc valve via a variable orifice (for example, refer to Patent Literature 1 (JP-UM-A-S62-155242)). According to this kind of the damping force adjusting apparatus, a passage area between two chambers in the cylinder is adjusted by opening and closing the variable orifice, a pressure (back pressure) of the pilot chamber is changed by a pressure loss generated in the variable valve, and thus, it is possible to adjust a valve opening pressure of the disc valve. Accordingly, it is possible to widen an adjustment range of the damping force characteristics.

However, according to the above-mentioned damping force adjusting apparatus, when a flow path area of the variable orifice is decreased so that the damping force is adjusted to a hard side, as shown in FIG. 14, an opening degree of a disc valve 101 decreases as the pressure of the pilot chamber increases, and thus, a gap between the disc valve 101 and a valve seat 102 decreases. Accordingly, a speed of the working fluid passing through the gap is increased, and thus, the working fluid becomes a jet stream. Therefore, a pressure at the gap between the disc valve 101 and the valve seat 102 is decreased, a force in a valve closing direction acts on the disc valve 101, and the damping force is increased. As a result, particularly, there is a problem that an excessive damping force is generated in the medium-high speed region of the piston speed.

Accordingly, as shown in FIG. 15, Patent Literature 2 (JP-A-H10-246271) suggests a damping force adjusting apparatus which adopts a configuration in which an outer circumferential edge of a disc valve 201 is bent to a valve seat 202 side and a guide portion 201a is formed. According to the last mentioned damping force adjusting apparatus, a jet stream of a working fluid passing through a gap between the disc valve 201 and the valve seat 202 when the valve is opened is ejected at an ejection angle θ along an outer circumferential portion of the valve seat 202 toward a gap between the valve seat 202 and the guide portion 201a of the disc valve 201. Accordingly, the force in the valve closing direction which acts on the disc valve 201 is decreased, and particularly, it is possible to prevent an excessive damping force in the medium-high speed region of the piston speed from being generated.

SUMMARY OF THE INVENTION

In the damping force adjusting apparatus which is suggested in Patent Literature 2 and adopts the configuration shown in FIG. 15, a method is adopted in which the force in the valve closing direction which acts on the disc valve 201 is decreased by the jet stream which directly acts on the disc valve 201.

In the damping force adjusting apparatus suggested in Patent Literature 2, only effects of suppressing the damping force in the medium-high speed region of the piston speed can be expected. On the other hand, it is not possible to generate a greater damping force. Accordingly, there is a problem that an adjustment range of the damping force is relatively narrow.

In view of above, an object of the present invention is to provide a shock absorber capable of obtaining a desired damping force characteristic by widening the adjustment range of the damping force in the medium-high speed region of the piston speed.

In a first aspect of the present invention, there is provided a shock absorber including: a cylinder in which a working fluid is enclosed; a piston which is slidably fitted in the cylinder; a piston rod which is connected to the piston and extends outside the cylinder; and a damping force generating apparatus which generates a damping force by controlling a flow of the working fluid caused by sliding of the piston in the cylinder, in which the damping force generating apparatus includes: a main flow path through which the working fluid flows by the sliding of the piston in the cylinder; a main valve which generates the damping force by controlling the flow of the working fluid by opening and closing the main flow path; a bypass flow path which is branched from the main flow path or is provided on the main valve; a pilot chamber into which the working fluid flows via the bypass flow path and which applies an internal pressure in a valve closing direction to the main valve by a pressure of the working fluid; and a pilot flow path to which the working fluid flows out from the pilot chamber, wherein a jet stream which is generated in a flow path narrowed by the main valve in the main flow path joins the flow of the working fluid which flows out from the pilot chamber via the pilot flow path.

In a second aspect of the present invention, there is provided a shock absorber including: a cylinder in which a working fluid is enclosed; a piston which is slidably fitted in the cylinder; a piston rod which is connected to the piston and extends outside the cylinder; and a damping force generating apparatus which generates a damping force by controlling a flow of the working fluid caused by sliding of the piston in the cylinder, in which the damping force generating apparatus includes: a main flow path through which the working fluid flows by the sliding of the piston in the cylinder; a main valve which generates the damping force by controlling the flow of the working fluid by opening and closing the main flow path; a bypass flow path which is branched from the main flow path or is provided on the main valve; a pilot chamber into which the working fluid flows via the bypass flow path and which applies an internal pressure in a valve closing direction to the main valve by a pressure of the working fluid; and a pilot flow path to which the working fluid flows out from the pilot chamber, wherein a jet stream which is generated by narrowing the entire main flow path or a partial flow path of the main flow path other than a location at which the main valve is included, joins the flow of the working fluid which flows out from the pilot chamber via the pilot flow path.

In a third aspect of the present invention, in addition to the first or second aspect, the flow of the working fluid flowing out from the pilot chamber via the pilot flow path may join the jet stream in a same direction as a flow of the jet stream flowing through the main flow path.

In a fourth aspect of the present invention, in addition to the first or second aspect, the flow of the working fluid flowing out from the pilot chamber via the pilot flow path may join the jet stream in a direction opposite to a flow of the jet stream flowing through the main flow path.

In a fifth aspect of the present invention, in addition to any one of the first to fourth aspects, the shock absorber may further include a shielding member which shields at least one of the flow of the working fluid flowing out from the pilot chamber via the pilot flow path and the flow of the jet stream flowing through the main flow path, in which the shielding member is provided in a location at which the flow of the working fluid flowing out from the pilot chamber via the pilot flow path joins the jet stream flowing through the main flow path.

In a sixth aspect of the present invention, in addition to any one of the first to fourth aspects, the shock absorber may further include a flow changing member which changes a direction of at least one of the flow of the working fluid flowing out from the pilot chamber via the pilot flow path and the flow of the jet stream flowing through the main flow path, in which the flow changing member is provided in a location at which the flow of the working fluid flowing out from the pilot chamber via the pilot flow path joins the jet stream flowing through the main flow path.

In a seventh aspect of the present invention, in addition to any one of the first to sixth aspects, the damping force generating apparatus may be provided inside the piston.

In an eighth aspect of the present invention, in addition to any one of the first to sixth aspects, the damping force generating apparatus may be provided outside the piston.

According to the first aspect, the jet stream which is generated in the flow path narrowed by the main valve in the main flow path joins the flow of the working fluid which flows out from the pilot chamber via the pilot flow path. Alternatively, according to the second aspect, the jet stream which is generated by narrowing the entire main flow path or a partial flow path of the main flow path other than a location at which the main valve is disposed joins the flow of the working fluid which flows out from the pilot chamber via the pilot flow path. The flow of the working fluid which flows out from the pilot chamber via the pilot flow path is adjusted by a force of the jet stream flowing through the main flow path. In either the first aspect or the second aspect, the jet stream joins the flow of the working fluid which flows out from the pilot chamber via the pilot flow path. Accordingly, a back pressure of the pilot chamber is also adjusted using the jet stream of the working fluid which flows through the main valve of the main flow path. Therefore, it is also possible to adjust a pressurizing force in a valve closing direction which acts on the main valve using the jet stream, and thus, it is possible to adjust a desired damping force.

According to the third aspect, the flow of the working fluid flowing out from the pilot chamber via the pilot flow path joins in the same direction as the jet stream flowing through the main flow path. Accordingly, in a medium-high speed region of a piston speed, a sucking effect is generated in the flow of the working fluid flowing out from the pilot chamber via the pilot flow path, by the force of the jet stream flowing through the main flow path. As a result, the back pressure of the pilot chamber is decreased, the force pressing the main valve in the valve closing direction is decreased, an opening degree of the main valve is increased, and thus, it is possible to prevent the damping force in the medium-high speed region of the piston speed from being increased.

According to the fourth aspect, the flow of the working fluid which flows out from the pilot chamber via the pilot flow path joins in the direction opposite to the flow of the jet stream flowing through the main flow path. Accordingly, the flow of the working fluid flowing out from the pilot chamber via the pilot flow path collides with the jet stream flowing through the main flow path, and thus, the force of the flow of the working fluid which flows out from the pilot chamber is suppressed. As a result, the back pressure of the pilot chamber is increased, the force pressing the main valve in the valve closing direction is increased, the opening degree of the main valve is decreased, and thus, it is possible to adjust the damping force in the medium-high speed region of the piston speed so as to be increased.

According to the fifth aspect, the shielding member by which at least one of the flow of the working fluid flowing out from the pilot chamber via the pilot flow path and the jet stream flowing through the main flow path is shielded is provided in the location at which the flow of the working fluid flowing out from the pilot chamber via the pilot flow path joins the jet stream flowing through the main flow path. Accordingly, the force of at least one of the flow of the working fluid which flows out from the pilot chamber via the pilot flow path and the jet stream flowing through the main flow path is suppressed by the shielding member. Accordingly, the back pressure of the pilot chamber is also adjusted. Therefore, it is also possible to adjust the pressurizing force in a valve closing direction which acts on the main valve, and thus, it is possible to adjust a desired damping force.

According to the sixth aspect, the flow changing member which changes the direction in which at least one of the flow of the working fluid flowing out from the pilot flow path and the jet stream flowing through the main flow path flows is provided in the location at which the flow of the working fluid which flows out from the pilot chamber via the pilot flow path joins the jet stream flowing through the main flow path. Accordingly, the direction in which at least one of the flow of the working fluid flowing out from the pilot flow path and the jet stream flowing through the main flow path working fluid flows is changed at the location at which the flow of the working fluid which flows out from the pilot chamber via the pilot flow path joins the jet stream flowing through the main flow path, and thus, it is possible to adjust a desired damping force by adjusting the back pressure of the pilot chamber.

According to the seventh aspect, the damping force generating apparatus is compactly incorporated into the piston, and for example, it is possible to use the shock absorber as a front fork or a rear cushion which suspends a wheel of a motorcycle to a vehicle body.

According to the eighth aspect, by disposing the damping force generating apparatus outside the piston, it is possible to freely dispose the damping force generating apparatus, and thus, it is possible to increase a degree of freedom of the layout. Accordingly, it is also possible to increase the degree of freedom of the layout with respect to disposition of a solenoid serving as an actuator or wiring of a harness or the like.

DETAILED DESCRIPTION OF THE INVENTION

Hereinafter, embodiments of the present invention will be described with reference to the accompanying drawings.

First Embodiment

Configuration of Shock Absorber

Figure 1:
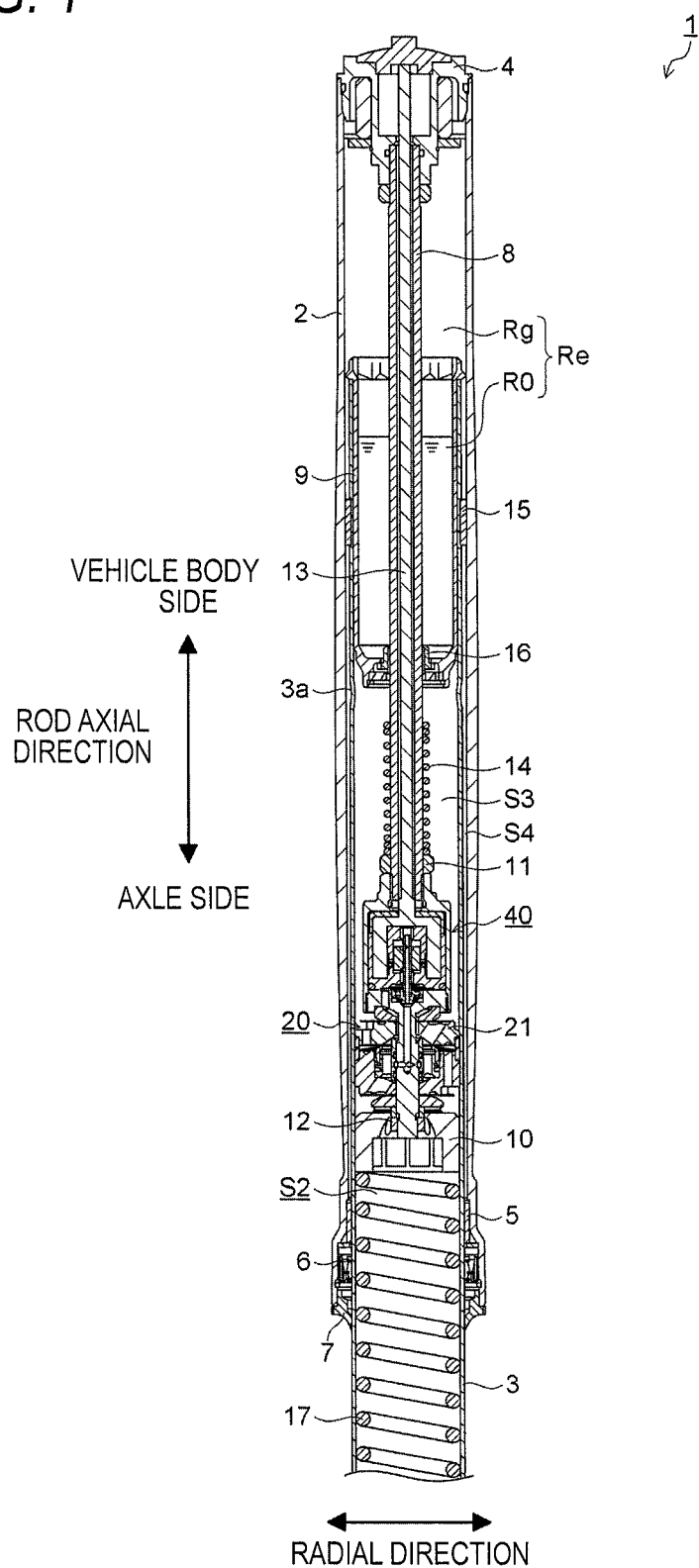
FIG. 1 is a vertical cross-sectional diagram of a main portion of a shock absorber according to a first embodiment of the present invention.
Figure 2:
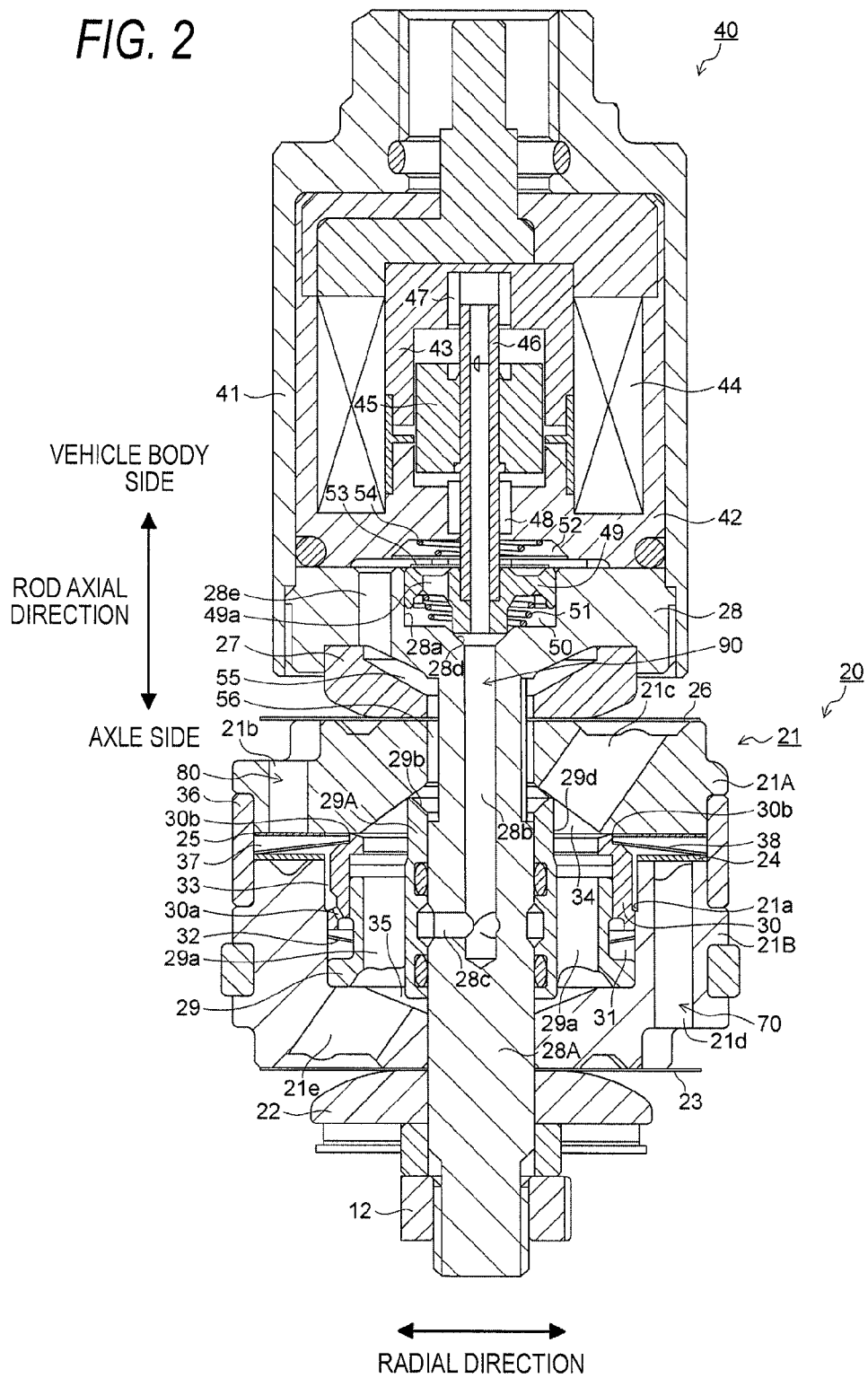
FIG. 2 is a vertical cross-sectional diagram of a damping force generating apparatus of the shock absorber according to the first embodiment of the present invention.

FIG. 1 is a vertical cross-sectional diagram of a main portion of a shock absorber 1 according to a first embodiment of the present invention, and FIG. 2 is a vertical cross-sectional diagram of a damping force generating apparatus of the shock absorber.

The shock absorber 1 according to the present embodiment is used as an inverted front fork which suspends a front wheel of a motorcycle (not shown) to a vehicle body, and as shown in FIG. 1, in the shock absorber 1, a portion of an inner tube 3 attached to an axle side is inserted into an outer tube 2 attached to the vehicle body side from below.

An upper end portion of the outer tube 2 is attached to the vehicle body (steering axis) of the motorcycle by an upper bracket (not shown) and a lower bracket (not shown), and an upper end of the outer tube 2 is sealed by a cap bolt 4. A guide bush 5, an oil seal 6, and a dust seal 7 which comes into sliding-contact with an outer circumference of the inner tube 3 are fitted to an inner circumference of a lower end opening portion of the outer tube 2 to which the inner tube 3 penetrates.

A hollow piston rod 8 in which an upper end is connected to the cap bolt 4 is hung down in an axial center in the outer tube 2. A portion of the piston rod 8 penetrates a bottomed cylindrical partition wall member 9 which is fitted to an upper end portion in the inner tube 3, and is inserted into the inner tube 3 from above. In addition, in a lower end portion of the piston rod 8, a solenoid 40 configuring an actuator of a damping force generating apparatus 20, a piston 21, and a spring collar 10 are connected by upper and lower nuts 11 and 12, and main portions of the damping force generating apparatus 20 are incorporated inside the piston 21. In addition, a power cord 13 for supplying power to the solenoid 40 is inserted into the piston rod 8. A rebound spring 14 is wound around the piston rod 8 on the nut 11.

The lower end portion of the inner tube 3 is attached to a front axle of the motorcycle via an axle attachment member (not shown), and a portion of the inner tube which is inserted into the outer tube 2 is slidably held vertically with respect to the outer tube 2 by a guide bush 15 which is fitted to an upper end outer circumference of the inserted portion and a guide bush 5 which is fitted to a lower end inner circumference of the outer tube 2. Thus, an annular oil chamber S4, in which an upper end and a lower end are sealed by the guide bush 15 and the guide bush 5, is formed in a gap between the inner circumference of the outer tube 2 and the outer circumference of the inner tube 3. In addition, in the inner tube 3, a communication hole 3a, through which a rod side oil chamber S3 inside the inner tube 3 and the annular oil chamber S4 communicate with each other, is formed on a portion below the partition wall member 9 described below.

In addition, a rod guide 16 to which the piston rod 8 penetrates is fitted into an axial center of a bottom portion of the partition wall member 9 fitted to an inner circumference of an upper end portion of the inner tube 3. Moreover, the piston rod 8 is slidably held vertically by the rod guide 16. The inner tube 3 is an example of a cylinder.

The piston 21 is slidably fitted vertically to the inner circumference of the inner tube 3. An inner portion enclosed by the outer tube 2 and the inner tube 3 is partitioned vertically by the partition wall member 9, and an upper space is an oil reservoir chamber Re which functions as a reservoir. The oil reservoir chamber Re is configured of an oil accommodation portion Ro in which the oil is supplied from and is discharged to the rod side oil chamber S3 through the partition wall member 9 as a border, and a gas accommodation portion Rg which is filled with a gas such as air.

In addition, a space below the partition wall member 9 inside the inner tube 3 is partitioned into the rod side oil chamber S3 and a piston side oil chamber S2 by the piston 21. The rod side oil chamber S3 and the piston side oil chamber S2 are filled with the oil serving as a working fluid. In addition, a suspension spring 17 is interposed between the bottom portion of the inner tube 3 and the spring collar 10. Moreover, leakage of the oil from the inner tube 3 is prevented by a sealing effect of the oil seal 6. Penetration of dust from the lower end opening portion of the outer tube 2 is prevented by a sealing effect of the dust seal 7.

Next, a configuration of the damping force generating apparatus 20 will be described below in detail with reference to FIG. 2.

In the damping force generating apparatus 20, the main portions are incorporated into the piston 21. The piston 21 is divided into two portions such as an upper piston 21A and a lower piston 21B. In addition, a valve stopper 22, an extension side outlet check valve 23, a lower piston 21B, a compression side inlet check valve 24, an extension side inlet check valve 25, an upper piston 21A, a compression side outlet check valve 26, a valve stopper 27, a valve seat member 28, and a solenoid 40 are assembled in the vertical direction (axial direction) in this order from below, and thus, the damping force generating apparatus 20 is configured.

A rod portion 28A integrally protrudes downward from an axial center of the valve seat member 28. The rod portion 28A penetrates center portions in the radial directions of the valve stopper 27, the compression side outlet check valve 26, the upper piston 21A, the extension side inlet check valve 25, the compression side inlet check valve 24, the lower piston 21B, the extension side outlet check valve 23, and the valve stopper 22, and a nut 12 is screwed to a lower end portion of the rod portion 28A.

A main valve member 29 which is fitted to an outer circumference of the rod portion 28A of the valve seat member 28 is accommodated in a concave portion 21a of the lower piston 21B. A main valve 30 having an approximately cylindrical shape is slidably fitted and held vertically to an outer circumference of the main valve member 29. An annular pilot member (back pressure chamber) 31 partitioned by the main valve member 29 is formed on a rear surface side (lower side in FIG. 2) of the main valve 30 of the concave portion 21a of the main valve member 29. A plate spring 32 which biases the main valve 30 in an up direction (valve closing side) to seat the main valve 30 on a lower surface (seating surface) of the upper piston 21A is accommodated in the pilot chamber 31.

A flow path 33 is formed between the concave portion 21a of the lower piston 21B and the outer circumference of the main valve 30. The flow path 33 communicates with the pilot chamber 31 via an oil hole 30a which is formed in the main valve 30.

A space 34 which is cut in a taper shape is formed on a lower inner circumference of the upper piston 21A. An oil hole 21b which penetrates the upper piston 21A in the vertical direction and an inclined oil hole 21c are formed in the upper piston 21A. Here, the oil hole 21b is normally opened to the rod side oil chamber S3 (refer to FIG. 1) in the inner tube 3, and is selectively opened and closed by the extension side inlet check valve 25. In addition, the oil hole 21c is normally opened to the space 34, and is selectively opened and closed by the compression side outlet check valve 26.

A space 35 which is cut in a taper shape is formed on a lower inner circumference of the lower piston 21B. In addition, an oil hole 21d which penetrates the lower piston 21B in the vertical direction and an inclined oil hole 21e are formed in the lower piston 21B. Here, the oil hole 21d is normally opened to the piston side oil chamber S2 (refer to FIG. 1) formed in the inner tube 3, and is selectively opened and closed by the compression side inlet check valve 24. In addition, the oil hole 21e is normally opened to the space 35, and is selectively opened and closed by the extension side outlet check valve 23.

A concave portion 28a which is opened upward is formed on an axial center upper portion of the valve seat member 28. An oil hole 28b is formed downward in the axial center of the rod portion 28A from the concave portion 28a. In addition, an oil hole 28c is formed outward in the radial direction from a lower end portion of the oil hole 28b at a light angle. The oil hole 28c communicates with the pilot chamber 31 via an oil hole (not shown) which is formed on the main valve member 29 in the radial direction.

A plurality of oil holes 29a which penetrate in the axial direction are formed on the main valve member 29. One end (upper end) of the oil hole 29a communicates with the oil hole 21c of the upper piston 21A via the space 34 of the upper piston 21A, and the other end (lower end) communicates with the oil hole 21e of the lower piston 21B via the space 35 of the lower piston 21B.

A gap 37 in the vertical direction is formed between the upper piston 21A and the lower piston 21B by an annular distance collar 36 which is fitted to outer circumferences of both pistons 21A and 21B. In addition, the compression side inlet check valve 24 and the extension side inlet check valve 25 are provided in the gap 37. The compression side inlet check valve 24 and the extension side inlet check valve 25 are biased in the direction, in which the oil hole 21d of the lower piston 21B and the oil hole 21b of the upper piston 21A are closed, by a plate spring 38 interposed between the check valves 24 and 25.

Here, a configuration of the solenoid 40 will be described.

The solenoid 40 is configured to accommodate two bottomed cylindrical cores 42 and 43, an annular coil 44, a plunger 45 accommodated in the cores 42 and 43, a hollow operating rod 46 which penetrates an axial center of the plunger 45, and so on inside a cylindrical casing 41 in which a lower end opening inner circumference is screwed to the outer circumference of the valve seat member 28. Both end portions in the vertical direction of the operating rod 46 are supported to be movable in the vertical direction by cylindrical guide bushes 47 and 48. In addition, a pilot valve 49 is connected to a lower end outer circumference of the operating rod 46 facing the concave portion 28a of the valve seat member 28.

The pilot valve 49 is fitted to the inner circumference of the concave portion 28a of the valve seat member 28 to be movable in the vertical direction, is selectively seated on a tapered valve seat 28d formed on an upper end of the oil hole 28b formed in the axial center of the valve seat member 28, and thus, opens and closes the oil hole 28b. Here, a space 50 which is partitioned by the pilot valve 49 is formed in the concave portion 28a of the valve seat member 28. Moreover, a spring 51 which biases the pilot valve 49 in a valve opening direction (up direction in FIG. 2) is accommodated in the space 50. Here, the space 50 formed in the valve seat member 28 communicates with the pilot chamber 31 via the oil holes 28b and 28c of the valve seat member 28 and an oil hole (not shown) formed in the main valve member 29. In addition, an oil hole 49a penetrates the pilot valve 49. The oil hole 49a is normally opened to the space 50.

A concave space 52 is formed on an end surface of the core 42 of the solenoid 40 between the valve seat member 28 and the core 42 of the solenoid 40. A fail-valve 53 which selectively opens and closes the oil hole 49a of the pilot valve 49 is provided in the space 52. The fail-valve 53 is slidably held vertically on an outer circumference of the operating rod 46, and is biased in a valve closing direction (down in FIG. 2) by a spring 54 accommodated in the space 52. In addition, a spring constant of the spring 54 is set to be smaller than a spring constant of a spring 51 which biases the pilot valve 49 in the valve opening direction.

An oil hole 28e which penetrates in the vertical direction is formed in the valve seat member 28. The space 52 communicates with the space 34 of the upper piston 21A via the oil hole 28e, a cylindrical flow path 55 formed between the valve stopper 27 and the valve seat member 28, and a cylindrical flow path 56 formed between the upper piston 21A and the rod portion 28A of the valve seat member 28.

In the shock absorber 1 according to the present embodiment, a cylindrical guide portion 29A which extends to the space 34 of the upper piston 21A toward above is formed at a center portion in the radial direction of the main valve member 29. A tapered guide surface 29b which is inclined toward above is formed on an inner circumferential surface of the guide portion 29A.

In the damping force generating apparatus 20 configured as described above, the oil hole 21d of the lower piston 21B, the gap 37, the space 34 of the upper piston 21A, and the oil hole 21c of the upper piston 21A configure a main flow path 70 at a time of a compression side stroke. The main valve 30, the compression side inlet check valve 24, and the compression side outlet check valve 26 are provided in the main flow path 70. Moreover, the oil hole 21b of the upper piston 21A, the gap 37, the oil hole 29a of the main valve member 29, and the oil hole 21e of the lower piston 21B configure a main flow path 80 at a time of an extension side stroke. The main valve 30, the extension side inlet check valve 25, and the extension side outlet check valve 23 are provided in the main flow path 80.

In addition, the gap 37 between the upper piston 21A and the lower piston 21B, the flow path 33 formed on the outer circumferential side of the main valve 30, the oil hole 30a of the main valve 30, the pilot chamber 31, an oil hole (not shown) formed in the main valve member 29, oil holes 28c and 28b formed in the valve seat member 28, the space 50 formed by the pilot valve 49 and the valve seat member 28, the oil hole 49a formed in the pilot valve 49, the space 52 formed in the core 42 of the solenoid 40, the oil hole 28e formed in the valve seat member 28, the flow path 55 formed between the valve stopper 27 and the valve seat member 28, the flow path 56 communicating with the flow path 55, and the space 34 of the upper piston 21A configure a pilot flow path 90 for compression and extension side strokes. The pilot valve 49 and the fail-valve 53 are provided on the pilot flow path 90. Here, the flow path 33 and the oil hole 30a of the main valve 30 also function as a bypass flow path through which a portion of the oil flowing through the main flow paths 70 and 80 is introduced to the pilot chamber 31.

Operation of Shock Absorber

Figure 3:
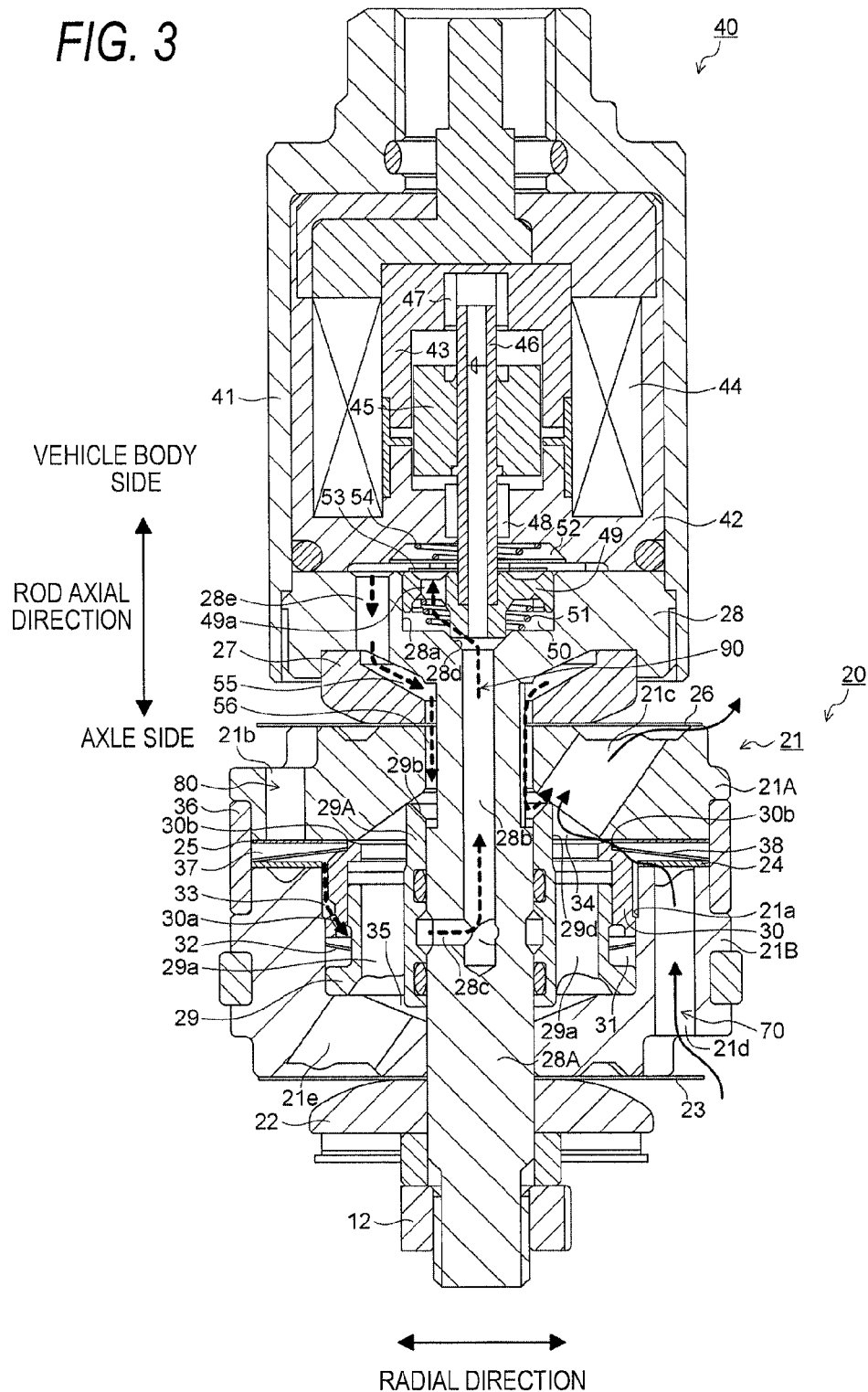
FIG. 3 is a vertical cross-sectional diagram showing a flow of oil at a time of a compression side stroke in the damping force generating apparatus of the shock absorber according to the first embodiment of the present invention.
Figure 4:
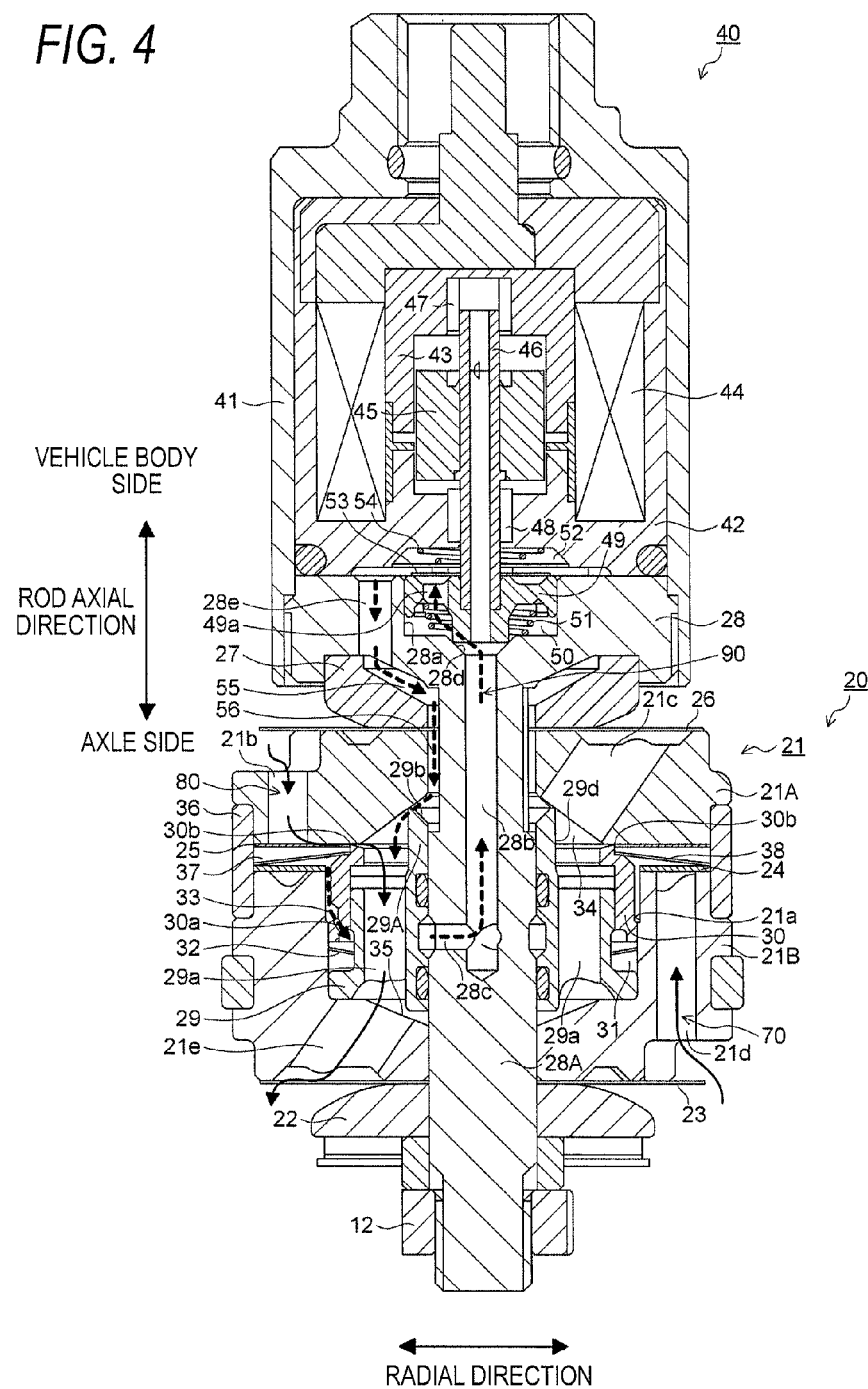
FIG. 4 is a vertical cross-sectional diagram showing a flow of oil at a time of an extension side stroke in the damping force generating apparatus of the shock absorber according to the first embodiment of the present invention.
Figure 5:
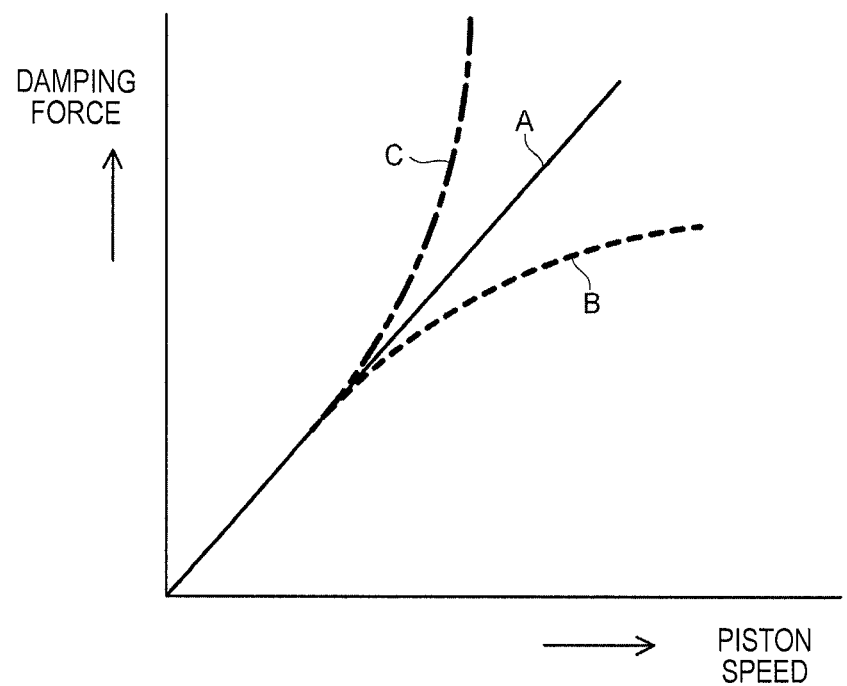
FIG. 5 is a graph showing a characteristic of a damping force with respect to a piston speed.

Next, operations at the time of the compression side stroke and at the time of the extension side stroke of the shock absorber 1 configured as above will be described with reference to FIGS. 3 to 5. In this connection, FIG. 3 is a vertical cross-sectional diagram showing a flow of oil at the time of the compression side stroke in the damping force generating apparatus of the shock absorber 1 according to the present embodiment, FIG. 4 is a vertical cross-sectional diagram showing the flow of the oil at the time of the extension side stroke in the damping force generating apparatus, and FIG. 5 is a graph showing a characteristic of a damping force with respect to a piston speed.

Compression Side Stroke

First, an operation at the time of the compression side stroke of the shock absorber 1 will be described below based on FIG. 3.

When the front wheel moves up and down by following irregularity of a road surface during travelling of the motorcycle, the outer tube 2 and the inner tube 3 of the shock absorber 1 which suspends the front wheel extend and contract. In the compression side stroke in which the inner tube 3 relatively moves up with respect to the outer tube 2, the oil in the piston side oil chamber S2 is compressed by the piston 21, and the pressure in the piston side chamber S2 increases. And then, the oil in the piston side oil chamber S2 flows into the rod side oil chamber S3 through the main flow path 70 at the time of the compression side stroke. Specifically, as shown by a solid line arrow in FIG. 3, the oil passes through the oil hole 21d of the lower piston 21B from the piston side oil chamber S2, flows to the gap 37 by pushing to open the compression side inlet check valve 24 against the biasing force of the plate spring 38, flows to the oil hole 21c of the upper piston 21A via the space 34 from the gap 37 by pushing to open the main valve 30 against the force in the valve closing direction due to the plate spring 32 and the back pressure of the pilot chamber 31 through the pressure in the gap 37, and flows into the rod side oil chamber S3 by pushing to open the compression side outlet check valve 26. In this case, a compression side damping force is generated in the shock absorber 1 by a flow resistance generated when the oil passes through the main valve 30.

Meanwhile, a portion of the oil flowing into the gap 37 through the oil hole 21d of the lower piston 21B from the piston side oil chamber S2 joins the oil which flows through the main flow path 70 via the pilot flow path 90. Specifically, as shown by a dashed line arrow in FIG. 3, a portion of the oil flowing into the gap 37 through the oil hole 21d of the lower piston 21B from the piston side oil chamber S2 passes through the oil hole 30a of the main valve 30 from the flow path 33 of the outer circumferential side of the main valve 30, flows into the pilot chamber 31, and flows into the space 50 of the valve seat member 28 through the oil hole (not shown) of the main valve member 29, the oil holes 28c and 28b of the valve seat member 28, and a gap between the pilot valve 49 and the valve seat 28d from the pilot chamber 31. Moreover, the oil flowing into the space 50 of the valve seat member 28 flows into the space 52 of the core 42 by pushing to open the fail-valve 53 against a biasing force of the spring 54 through the oil hole 49a of the pilot valve 49, flows into the space 34 of the upper piston 21A through the oil hole 28e of the valve seat member 28 and the flow paths 55 and 56 from the space 52, and joins the oil flowing through the main flow path 70 in the space 34.

Here, by driving the solenoid 40, moving the operating rod 46 and the pilot valve 49 connected to the operating rod in the vertical direction to change an opening degree of the pilot valve 49, it is possible to adjust the back pressure of the pilot chamber 31 by adjusting the flow resistance of the oil passing through the pilot valve 49. Consequently, it is possible to adjust the opening degree of the main valve 30 by controlling a force which presses the main valve 30 in the valve closing direction by the back pressure. In this way, by adjusting the opening degree of the main valve 30, it is possible to adjust the damping force which is generated by the flow resistance of the oil passing through the main valve 30. Specifically, when the opening degree of the pilot valve 49 is narrowed, the back pressure of the pilot chamber 31 increases, the opening degree of the main valve 30 is narrowed, and the damping force increases. Meanwhile, when the opening degree of the pilot valve 49 is largely adjusted, the opening degree of the main valve 30 increases, and the damping force is adjusted to be decreased.

In the first embodiment, as described above, the oil flowing through the pilot flow path 90 joins the oil flowing through the main flow path 70 in the space 34 of the upper piston 21A. However, both oils are controlled by the guide portion 29A of the main valve member 29. Hereinafter, a flow of the oil of the pilot flow path 90 is referred to as a "pilot stream", and a flow of the oil passing through the main valve 30 of the main flow path is referred to as a "jet stream". Here, the jet stream means a phenomenon in which a fluid having a speed flows in substantially one direction into a space from a small hole so as to be ejected, generally. The jet stream includes a case where the oil passing through the flow path is ejected by narrowing the flow path at the location at which the oil passes through the main valve 30 disposed on the main flow paths 70 and 80, a case where the oil passing though the flow path is ejected by narrowing the flow path at a location other than the location at which the main valve 30 is disposed such as a portion at which the flow of the oil passing through the main valve 30 disposed on the main flow paths 70 and 80 joins the pilot stream, and a case where a portion in which the pilot stream joins is provided on the middle of the flow having relatively high speed generated by the narrowing of the flow path.

The oil passing through the main valve 30 of the main flow path 70 shown in FIG. 3 becomes a jet stream which is ejected toward the rod portion 28A side (from an outer side to an inner side) in the radial direction. In addition, a flow direction of the pilot stream is controlled by the inclined guide surface 29b of the guide portion 29A. A inclination direction of the guide surface 29b and a direction of the jet stream are the same as each other with the guide portion 29A as a border. Accordingly, in the compression side stroke shown in FIG. 3, the pilot stream guided in the inclination direction of the guide surface 29b joins in the same direction as the direction of the jet stream of the oil passing through the main valve 30 of the main flow path 70. Accordingly, a sucking effect of the pilot stream is generated by a force of the flow in the jet stream of the oil passing through the main valve 30. As a result, the back pressure of the pilot chamber 31 decreases, a force by which the main valve 30 is pressed in the valve closing direction decreases, the opening degree of the main valve 30 increases, and thus, it is possible to prevent the compression side damping force in the medium-high speed region of the piston speed from being increased. Here, FIG. 5 shows the characteristic of the damping force with respect to the piston speed. According to the present embodiment, as shown in a dashed line B relatively with respect to a linear characteristic shown in a solid line A, it is possible to suppress a rate of increase in the compression side damping force of the medium-high speed region of the piston speed.

In the shock absorber 1 according to the first embodiment shown in FIG. 3, the jet stream which is generated at the flow path 30b narrowed by the main valve 30 joins the pilot stream which is the flow of the oil flowing out through the pilot flow path 90 from the pilot chamber 31. However, the present invention is not limited to this, a jet stream may be generated by narrowing the entire main flow path 70 or a partial flow path of the main flow path 70 other than a location of the flow path 30b at which the main valve 30 is disposed, and joins the pilot stream. In either case, the jet stream joins the pilot stream. Accordingly, the back pressure of the pilot chamber 31 is also adjusted using the jet stream of the oil passing through the main valve 30 of the main flow path 70. Therefore, it is also possible to adjust a pressurizing force in the valve closing direction which acts on the main valve 30, using the jet stream, and it is possible to adjust the damping force to a desired damping force.

In addition, the guide portion 29A shown in FIG. 3 is not limited to the sucking effect of the jet stream due to the force of the flow in the above-described jet stream according to a shape of the guide portion 29A. For example, by approaching a wall surface portion 29d of the guide portion 29A to the jet stream, the guide portion 29A may be a shielding member having an effect which further suppresses the force of the jet stream as the main object. By suppressing the force of the jet stream, the pilot stream and the back pressures of the pilot chamber 31 are also adjusted. Accordingly, it is also possible to adjust the pressurizing force in the valve closing direction which acts on the main valve 30, and it is possible to adjust the damping force to a desired damping force. In this case, the wall surface portion 29d shields the jet stream which is the flow of the oil flowing through the main valve 30 in the main flow path 70. However, the present invention is not limited to this, a shielding member which suppresses the force of the pilot stream flowing out from the pilot chamber 31 via the pilot flow path 90 may be provided, and thus, the damping force may be adjusted to the desired damping force. In addition, the shielding member may be provided not only on either the jet stream side or the pilot stream side as described above but also on both the jet stream side and the pilot stream side, and thus, the damping force may be adjusted to the desired damping force.

In addition, for example, by changing an inclination angle of the guide surface 29b, the guide portion 29A shown in FIG. 3 may be a flow changing member which changes the flow direction of the pilot stream which is the flow of the oil flowing out from the pilot chamber 31 via the pilot flow path 90. By changing the flow direction of the pilot stream, it is possible to adjust the damping force to the desired damping force by adjusting the back pressure of the pilot chamber 31. In this case, the guide portion 29A changes the flow direction of the pilot stream. However, the present invention is not limited to this, a flow changing member which changes the flow direction of the jet stream which is the flow of the oil flowing through the main valve 30 in the main flow path 70 may be provided, and thus, the damping force may be adjusted to the a desired damping force. In addition, the flow changing member may be provided not only on either the jet stream side or the pilot stream side as described above but also on both the jet stream side and the pilot stream side, and thus, the damping force may be adjusted to a desired damping force. Moreover, the shielding member and/or the flow changing member may be provided on the join location between the pilot stream and the jet stream or each outlet of the pilot stream and the jet stream, and the damping force may be adjusted to the desired damping force by adjusting the back pressure of the pilot chamber 31.

In the compression side stroke, the oil corresponding to an amount of an inserted volume of the piston rod 8 which is inserted into the inner tube 3 is transferred to the annular oil chamber S4 via the communication hole 3a from the rod side oil chamber S3 in the inner tube 3. In this case, since an increased amount of volume $\Delta V_1$ (supply amount) of the annular oil chamber S4 is larger than an increased amount of volume $\Delta V_2$ of the piston rod 8, in the supply amount of the oil supplied to the annular oil chamber S4, a shortage of "$\Delta V_1 - \Delta V_2$" is supplied from the oil accommodation portion Ro to the rod side oil chamber S3. In addition, the supply of the oil with respect to the shortage is performed by a supply-discharge portion (not shown) which is formed on a bottom portion of the partition wall member 9 and through which the oil is supplied from the rod side oil chamber S3 to the oil accommodation portion Ro and is discharged from the oil accommodation portion Ro to the rod side oil chamber S3.

Extension Side Stroke

Next, an operation at the time of the extension side stroke of the shock absorber 1 will be described below based on FIG. 4.

In the extension side stroke in which the inner tube 3 relatively moves down with respect to the outer tube 2, the oil in the rod side oil chamber S3 is compressed by the piston 21, and the pressure in the rod side oil chamber S3 increases. And then, the oil in the rod side oil chamber S3 flows into the piston side oil chamber S2 through the main flow path 80 at the time of the extension side stroke. Specifically, as shown by a solid line arrow in FIG. 4, the oil passes through the oil hole 21b of the upper piston 21A from the rod side oil chamber S3, flow to the gap 37 by pushing to open the extension side inlet check valve 25 against the biasing force of the plate spring 38, flows to the oil hole 29a of the main valve member 29 and the oil hole 21e of the lower piston 21B from the gap 37 by pushing to open the main valve 30 against the force in the valve closing direction due to the plate spring 32 and the back pressure of the pilot chamber 31 through the pressure in the gap, and flows into the piston side oil chamber S2 by pushing to open the extension side outlet check valve 23. In this case, an extension side damping force is generated in the shock absorber 1 by the flow resistance generated when the oil passes through the main valve 30.

Meanwhile, similar to the time of the compression side stroke, a portion of the oil flowing into the gap 37 through the oil hole 21b of the upper piston 21A from the rod side oil chamber S3 joins the oil which flows through the main flow path 80 via the pilot flow path 90. Here, the flow of the oil in the pilot flow path 90 is indicated by a dashed line arrow in FIG. 4.

In the first embodiment, as described above, the oil flowing through the pilot flow path 90 joins the jet stream of the oil flowing through the main valve 30 of the main flow path 80 in the space 34 of the upper piston 21A.

The oil passing through the main valve 30 of the main flow path 80 shown in FIG. 4 becomes the jet stream which is ejected toward the rod portion 28A side (from the outer side to the inner side) in the radial direction. In addition, the flow direction of the pilot stream is controlled by the inclined guide surface 29b of the guide portion 29A. However, with the guide portion 29A as a border, the direction of the jet stream becomes different from the inclination direction of the guide surface 29b of the guide portion 29A unlike the direction at the time of the compression side stroke. Accordingly, compared to the compression side stroke, in the extension side stroke, the influence of the sucking effect of the pilot stream by the jet stream is decreased. Therefore, the influence of the effect of suppressing the increase in the damping force in the medium-high speed region of the piston speed is also decreased.

Moreover, in the compression side stroke, the case where the jet stream generated in the flow path 30b narrowed by the main valve 30 joins the pilot stream, or the case where the jet stream, which is generated by narrowing the entire main flow path 70 or a partial flow path of the main flow path 70 other than the location of the flow path 30b at which the main valve 30 is disposed, joins the pilot stream is shown. Similarly, also in the extension side stroke, the case where the jet stream generated in the flow path 30b narrowed by the main valve 30 joins the pilot stream, or the case where the jet stream, which is generated by narrowing the entire main flow path 80 or a partial flow path of the main flow path 80 other than the location of the flow path 30b at which the main valve 30 is disposed, joins the pilot stream may be adopted. In either case, the pressurizing force in the valve closing direction acting on the main valve 30 is adjusted by having the jet stream join the pilot stream, and thus, the damping force may be adjusted to the desired damping force.

In addition, for example, in the compression side stroke, the case where the shielding member and/or the flow changing member is provided on the join location between the pilot stream and the jet stream or each outlet of the pilot stream and the jet stream by changing the shape of the guide portion 29A is also illustrated. Similarly, also in the extension side stroke, the shielding member and/or the flow changing member may be provided on the join location between the pilot stream and the jet stream or each outlet of the pilot stream and the jet stream, consequently, the back pressure of the pilot chamber 31 is adjusted, and thus, the damping force may be adjusted to the desired damping force.

In the extension side stroke, the oil corresponding to the amount of the retreated volume of the piston rod 8 which retreats from the inner tube 3 is transferred to the rod side oil chamber S3 via the communication hole 3a from the annular oil chamber S4. In this case, since a decreased amount of volume $\Delta V_3$ (discharge amount) of the annular oil chamber S4 is larger than a decreased amount of volume $\Delta V_4$ of the piston rod 8, in the discharge amount of the oil discharged to the annular oil chamber S4, an excess of "$\Delta V_3 - \Delta V_4$" is discharged to the oil accommodation portion Ro from the rod side oil chamber S3. In addition, the discharge of the oil with respect to the excess is performed by the supply-discharge portion (not shown) which is formed on the bottom portion of the partition wall member 9 and through which the oil is supplied from the rod side oil chamber S3 to the oil accommodation portion Ro and is discharged from the oil accommodation portion Ro to the rod side oil chamber S3.

In the first embodiment, it is possible to control the back pressure of the pilot chamber 31 using the join direction between the jet stream of the oil passing through the main valve 30 of the main flow paths 70 and 80 and the pilot stream. Consequently, by controlling the back pressure of the pilot chamber 31, the opening degree of the main valve 30 is effectively adjusted, and thus, it is possible to easily adjust the damping force to the desired damping force.

Second Embodiment

Next, a second embodiment of the present invention will be described below with reference to FIG. 6.

Figure 6:
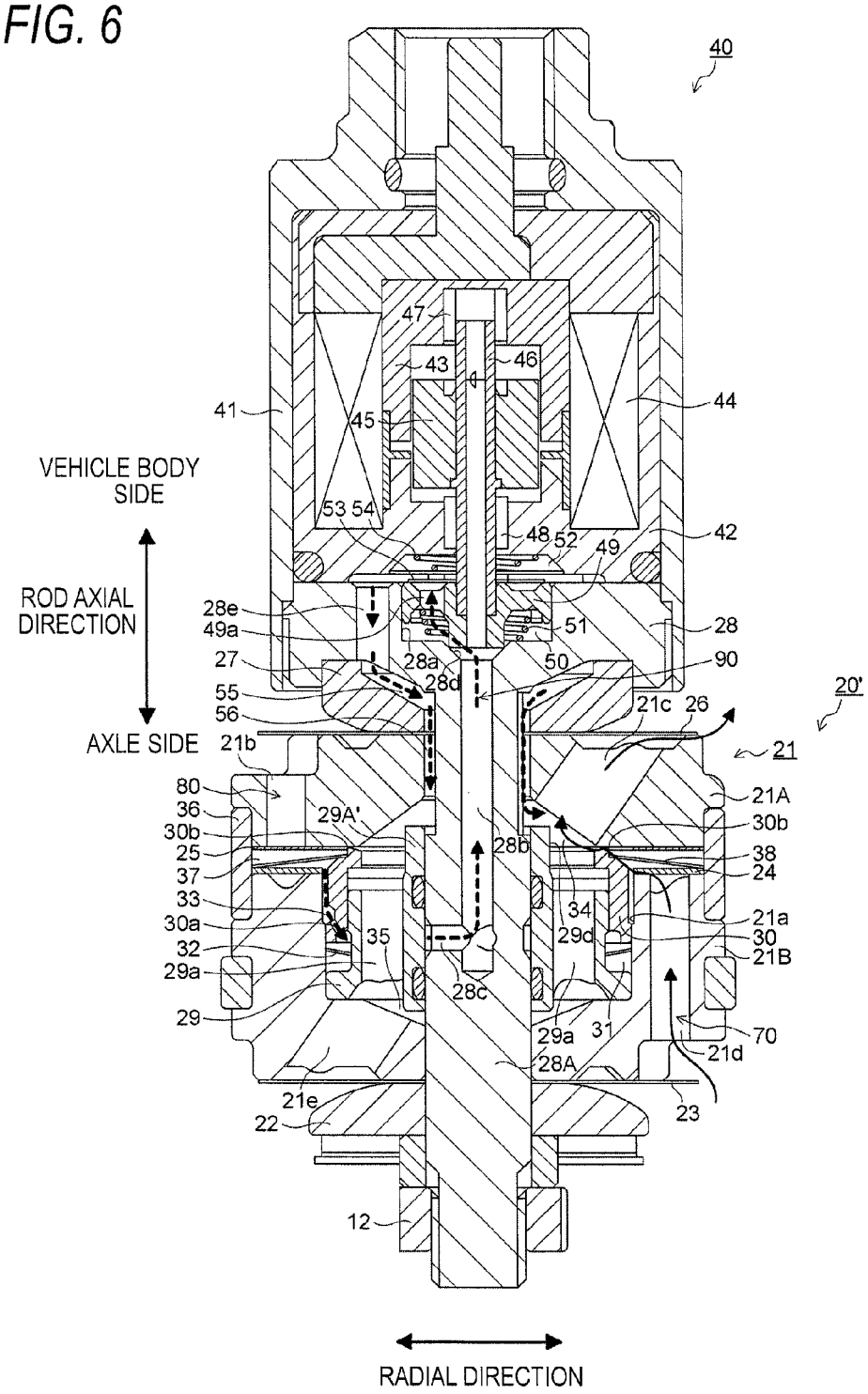
FIG. 6 is a vertical cross-sectional diagram of a damping force generating apparatus of a shock absorber according to a second embodiment of the present invention.

FIG. 6 is a vertical cross-sectional diagram of a damping force generating apparatus 20' of a shock absorber according to the second embodiment of the present invention. In FIG. 6, the same reference numerals are assigned to the same components shown in FIG. 2, and the overlapping descriptions are omitted or simplified.

The basic configurations of the shock absorber 1 and the damping force generating apparatus 20' according to the second embodiment are the same as those of the first embodiment. However, the damping force generating apparatus 20' according to the second embodiment is different from the first embodiment in that an upper surface of a guide portion 29A' of the main valve member 29 does not protrude to the space 34 of the upper piston 21A, and the upper surface is configured of a flat surface.

In the damping force generating apparatus 20' according to the second embodiment, in the compression side stroke, the pilot stream flowing through the pilot flow path 90 joins the jet stream of the oil passing through the main valve 30 of the main flow paths 70 and 80 in the space 34 of the upper piston 21A. However, unlike the guide portion 29A, since the upper surface of the guide portion 29A' does not guide the direction of the pilot stream, the sucking effect due to the pilot stream joining the jet stream in the same direction as the jet stream and a collision effect due to the pilot stream joining the jet stream in the direction opposite to the jet stream are suppressed. As a result, the influence on the back pressure of the pilot chamber 31 with respect to the increase of the pilot flow path 90 due to the jet stream and the influence thereon with respect to the decrease of the pilot flow path due to the jet stream are decreased. Accordingly, the force which presses the main valve 30 in the valve closing direction is not relatively increased or decreased, and the opening degree of the main valve 30 can cause the damping force in the medium-high speed region of the piston speed to be a damping force shown in a substantially linear solid line A which is an intermediate line which is not the dashed line B or a one dot chain line C of FIG. 5.

In the second embodiment, the direction in which the jet stream of the oil passing through the main valve 30 of the main flow paths 70 and 80 joins the pilot stream is not specified, and it is possible to linearly control the damping force without increasing or decreasing the back pressure of the pilot chamber 31. Moreover, by controlling the back pressure of the pilot chamber 31, the opening degree of the main valve 30 is effectively adjusted, and thus, it is possible to easily adjust the damping force to the desired damping force.

Third Embodiment

Next, a third embodiment of the present invention will be described below with reference to FIG. 7.

Figure 7:
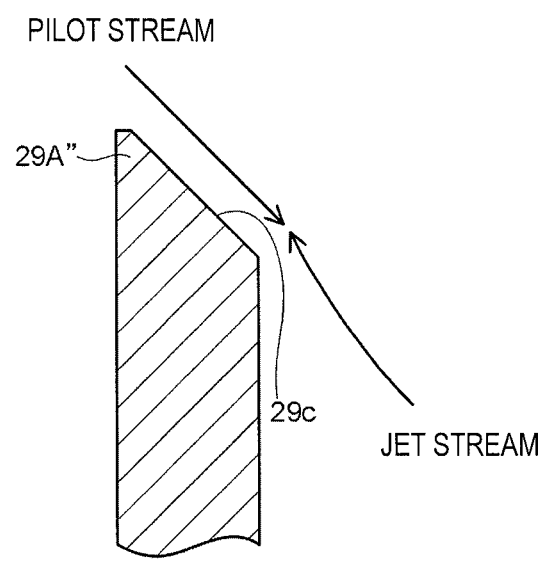
FIG. 7 is a partial vertical cross-sectional diagram of a guide portion of a shock absorber according to a third embodiment of the present invention.

FIG. 7 is a partial vertical cross-sectional diagram of a guide portion of a shock absorber according to the third embodiment of the present invention. The same reference numerals are assigned to the same components, and the overlapping descriptions are omitted or simplified.

Similar to the first embodiment, even when a guide portion 29A" shown in FIG. 7 protrudes to the space 34 of the upper piston 21A, an outer circumference of an upper end portion of the guide portion 29A" can become a tapered guide surface 29c which is inclined toward above in the direction opposite to the direction of the first embodiment. Accordingly, the inclination direction of the guide surface 29c shown in FIG. 7 and the direction of the jet stream become directions opposite to each other with the guide portion 29A" as the border. Accordingly, in the compression side stroke, the pilot stream guided in the inclination direction of the guide surface 29c joins the jet stream of the oil passing through the main valve 30 of the main flow path 70 in the direction opposite to the direction of the jet stream, and collides with the jet stream. Accordingly, the force of the flow of the pilot stream which flows out via the pilot flow path 90 from the pilot chamber 31 is suppressed due to a collision with the jet stream flowing through the main valve 30. As a result, the back pressure of the pilot chamber 31 increases, the force which presses the main valve 30 in the valve closing direction also increases, and the opening degree of the main valve 30 decreases. Accordingly, it is possible to highly adjust the damping force in the medium-high speed region of the piston speed as shown by the one dot chain line C of FIG. 5. Similar to the compression side stroke, also in the extension side stroke, since the jet stream and the pilot stream collide with each other in the direction opposite to each other, it is possible to highly adjust the damping force in the medium-high speed region of the piston speed.

In the third embodiment, it is possible to control the back pressure of the pilot chamber 31 using the join direction between the jet stream of the oil passing through the main valve 30 of the main flow paths 70 and 80 and the pilot stream. And then, by controlling the back pressure of the pilot chamber 31, the opening degree of the main valve 30 is effectively adjusted, and thus, it is possible to easily adjust the damping force to the desired damping force.

In the first to third embodiments, the jet stream which is generated in the flow path 30b narrowed by the main valve 30 in the main flow paths 70 and 80 joins the flow of the oil which flows out via the pilot flow path 90 from the pilot chamber 31. Accordingly, the back pressure of the pilot chamber 31 is also adjusted using the jet stream of the oil passing through the main valve 30 of the main flow paths 70 and 80. Accordingly, it is possible also to adjust the pressurizing force in the valve closing direction acting on the main valve 30 using the jet stream, and thus, it is possible to adjust the damping force to a desired damping force.

In addition, as shown in the first to third embodiments, by changing the join direction between the oil flowing through the pilot flow path 90 and the oil passing through the main valve 30, the back pressure of the pilot chamber 31 is adjusted in only one stroke or both strokes of the compression side stroke and the extension side stroke, and thus, it is possible to adjust the damping force.

Moreover, as shown in the first to third embodiments, the damping force generating apparatus 20 and the solenoid 40 are compactly incorporated to the piston 21, and thus, for example, it is possible to use the shock absorber 1 not only as the front fork by which the front wheel of the motorcycle is suspended to the vehicle body but also as a rear cushion.

Figure 8A:
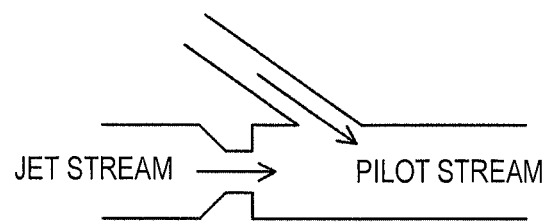
FIGS. 8A, 8B, 8C, 8D and 8E are schematic diagrams showing various aspects of joining between a pilot stream and a jet stream.
Figure 8B:
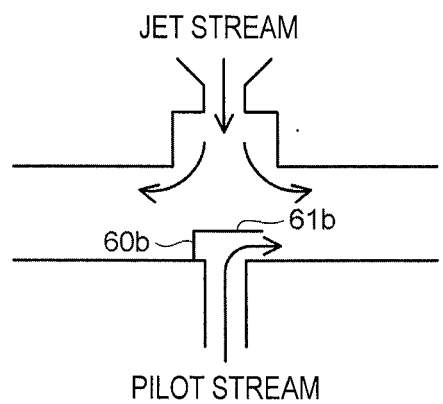
Figure 8C:
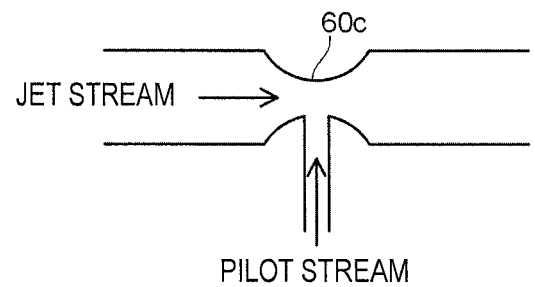

In the first to third embodiments, the back pressure of the pilot chamber 31 is controlled by controlling the flow of the oil flowing to the downstream of the pilot valve 49 of the pilot flow path 90 and the flow of the jet stream of the oil passing through the main valve 30 of the main flow paths 70 and 80, and accordingly, the damping force is adjusted in the medium-high speed region of the piston speed, particularly. For example, as a configuration for decreasing the back pressure of the pilot chamber 31, aspects schematically shown in FIGS. 8A to 8C are considered. Meanwhile, for example, as a configuration for increasing the back pressure of the pilot chamber 31, aspects schematically shown in FIGS. 8D and 8E are considered.

That is, FIG. 8A shows a configuration in which the pilot stream flowing through the pilot flow path 90 joins the jet stream flowing through the main flow paths 70 and 80 in the same direction along the flow direction of the jet stream. FIG. 8B shows a configuration in which a flow changing member 60b is provided, which prevents the collision between the pilot stream and the jet stream to change the flow direction of the pilot stream even when the pilot stream and the jet stream join each other in the opposite direction. Accordingly, the force of at least one flow of the jet stream and the pilot stream is suppressed by the flow changing member 60b. Therefore, the back pressure of the pilot chamber is adjusted. Accordingly, it is possible to adjust the pressurizing force in the valve closing direction acting on the main valve, and it is possible to adjust the damping force to a desired damping force. However, the flow changing member 60*b* shown in FIG. 8B is not limited to the configuration in which the direction of any one flow of the jet stream and the pilot stream is changed and the jet stream and the pilot stream join each other. For example, by extending the length of the shielding member 61*b* which is the location at which the pilot stream collides with the flow changing member 60*b*, or the like, a main object of the shielding member 61*b* may be shielding of any one flow of the jet stream and the pilot stream. Accordingly, the force of at least one flow of the jet stream and the pilot stream is suppressed by the shielding member 61*b*, and the back pressure of the pilot chamber is also adjusted. Therefore, it is possible to adjust the pressurizing force in the valve closing direction acting on the main valve, and it is possible to adjust the damping force to a desired damping force.

FIG. 8C shows a configuration in which a portion of the main flow path is narrowed so as to form a venturi tube, and the pilot stream flows to a portion which is narrowed at a throttle portion 60*c* and in which the flow speed increases. FIG. 8C is an example when the portion at which the pilot stream joins the jet stream is provided at the intermediate of the jet stream which has a relatively high speed flow generated by the narrowing of the flow path. According to this configuration, the back pressure of the pilot chamber 31 is decreased, and the damping force can be adjusted so as to be decreased.

Figure 8D:
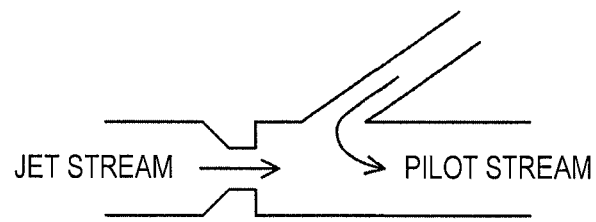
Figure 8E:
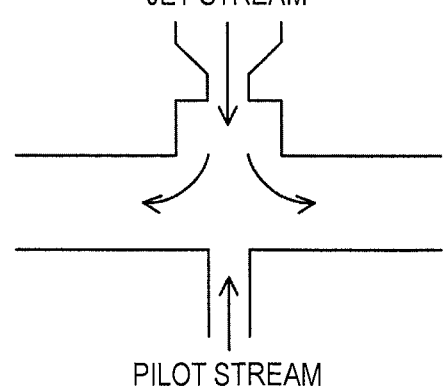

Meanwhile, FIG. 8D shows a configuration in which the pilot stream flowing through the pilot flow path 90 joins the jet stream flowing through the main flow paths 70 and 80 in the direction opposite to the flow direction of the jet stream and the pilot stream and the jet stream collide with each other. FIG. 8E shows a configuration in which the pilot stream and the jet stream collide with each other in a head-to-head relation. According to these configurations, the back pressure of the pilot chamber 31 increases, and thus, it is possible to adjust the damping force so as to be increased.

In this connection, in each configuration shown in FIGS. 8A to 8D, as described in the first to third embodiments, the jet stream generated in the flow path 30*b* narrowed by the main valve 30 may join the flow of the oil which flows out via the pilot flow path 90 from the pilot chamber 31. In addition, the present invention is not limited to this, the jet stream, which is generated by narrowing the entirety of the main flow paths 70 and 80 or a partial flow path of the main flow paths 70 and 80 other than the location of the flow path 30*b* at which the main valve 30 is disposed, may join the flow of the oil flowing through the pilot flow path 90 from the pilot chamber 31. In either case, the jet stream joins the flow of the oil which flows out via the pilot flow path 90 from the pilot chamber 31. Accordingly, the back pressure of the pilot chamber 31 is also adjusted using the jet stream of the oil passing through the main valve 30 of the main flow paths 70 and 80. Accordingly, the pressurizing force in the valve closing direction acting on the main valve 30 is also adjusted using the jet stream, and thus, it is possible to adjust the damping force to a desired damping force.

Hydraulic Circuit

A hydraulic circuit of the shock absorber 1 of the present embodiment will be described. In this connection, the hydraulic circuit is the same in the first embodiment and the second embodiment.

Figure 9:
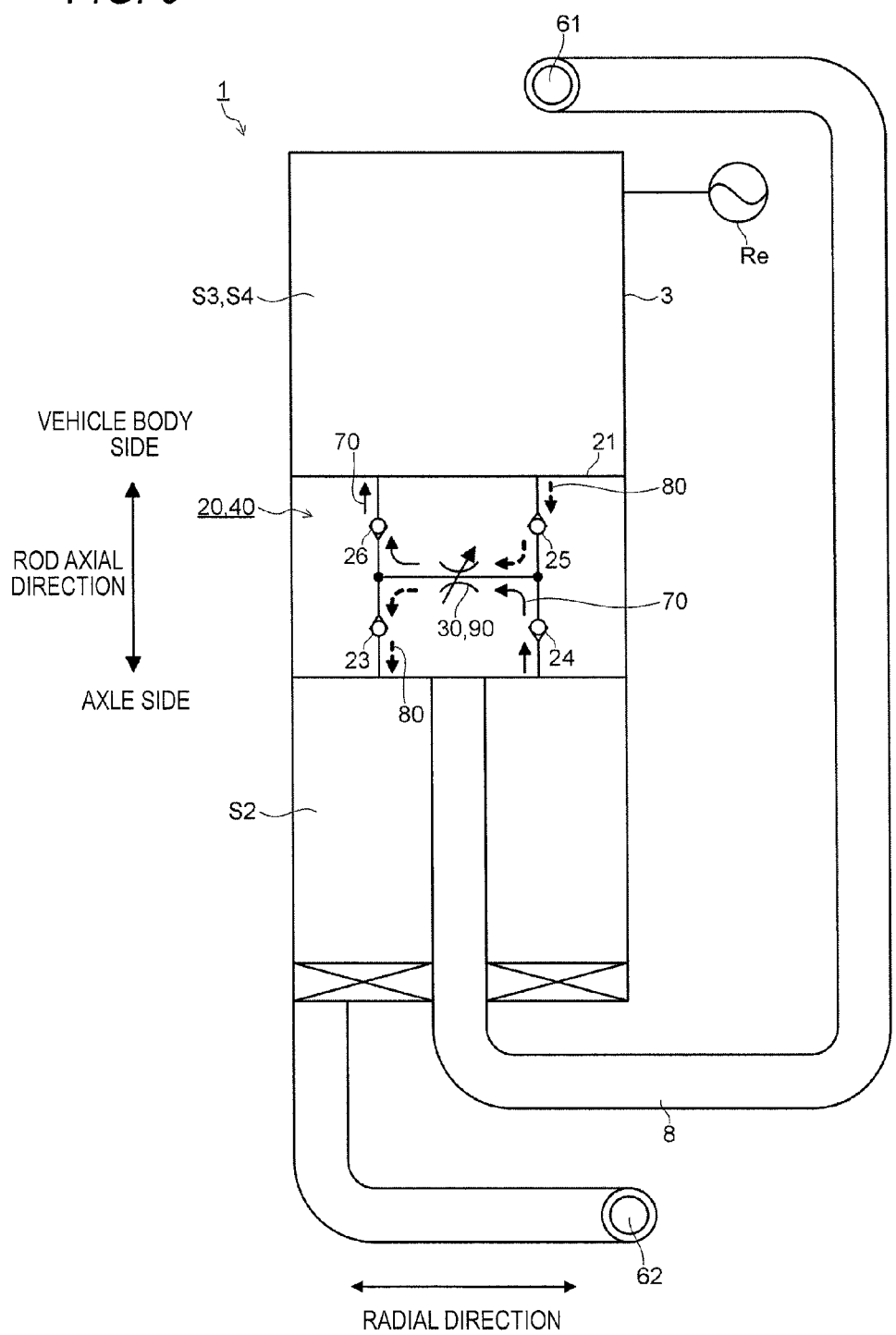
FIG. 9 is a hydraulic circuit diagram of the shock absorber of the present embodiment.

FIG. 9 is the hydraulic circuit diagram of the shock absorber 1 of the present embodiment. The hydraulic circuit shown in FIG. 9 includes the main valve 30, the pilot flow path 90, the compression side inlet check valve 24, the compression side outlet check valve 26, the extension side inlet check valve 25, the extension side outlet check valve 23, and the oil reservoir chamber Re. In addition, as shown in FIG. 9, for example, a vehicle body side mounting member 61 is provided on an upper end of the piston rod 8 of a side different from a side on which the piston 21 is provided. Meanwhile, for example, an axle side mounting member 62 is provided on a lower end of the inner tube 3. That is, the upper end of the piston rod 8 including the vehicle body side mounting member 61 becomes a vehicle body side, and the lower end of the inner tube 3 including the axle side mounting member 62 becomes an axle side.

In addition, in the hydraulic circuit shown in FIG. 9, the oil reservoir chamber Re is provide to directly communicate with the rod side oil chamber S3. The above-mentioned shortage of "$\Delta V_1 - \Delta V_2$" is supplied from the oil reservoir chamber Re to the rod side oil chamber S3, and the above-mentioned excess of "$\Delta V_3 - \Delta V_4$" is discharged from the rod side oil chamber S3 to the oil reservoir chamber Re. In this connection, the oil reservoir chamber Re includes an orifice (not shown), a check valve (not shown), or the like, and adjusts a flow rate of the oil.

1-1 Compression Side Stroke

In the shock absorber 1 including such hydraulic circuit, in the compression side stroke, the flow of the oil is indicated by a solid line arrow in the hydraulic circuit shown in FIG. 9. In the compression side stroke in which the inner tube 3 relatively moves up with respect to the outer tube 2, the oil inside the piston side oil chamber S2 is compressed by the piston 21, and the pressure in the piston side oil chamber S2 increases. And then, as described above, the oil inside the piston side oil chamber S2 flows into the rod side oil chamber S3 through the main flow path 70 at the time of the compression side stroke. In this case, the compression side damping force is generated in the shock absorber 1 by the flow resistance when the oil passes through the main valve 30. Here, the location at which the main flow path 70 and the pilot flow path 90 join each other as shown in FIGS. 3 and 6 corresponds to a location at which the reference numerals of the main valve 30 and the pilot flow path 90 are described in the hydraulic circuit shown in FIG. 9.

1-2 Extension Side Stroke

In the extension side stroke, the flow of the oil is indicated by a dashed line arrow in the hydraulic circuit shown in FIG. 9. In the extension side stroke in which the inner tube 3 relatively moves down with respect to the outer tube 2, the oil inside the rod side oil chamber S3 is compressed by the piston 21, and the pressure in the rod side chamber S3 increases. And then, as described above, the oil inside the rod side oil chamber S3 flows into the piston side oil chamber S2 through the main flow path 80 at the time of the extension side stroke. In this case, the extension side damping force is generated in the shock absorber 1 by the flow resistance when the oil passes through the main valve 30. Here, the location at which the main flow path 70 and the pilot flow path 90 join each other as shown in FIGS. 3 and 6 corresponds to the location at which the reference numerals of the main valve 30 and the pilot flow path 90 are described in the hydraulic circuit shown in FIG. 9.

Other Hydraulic Circuits

FIGS. 10 to 13 are hydraulic circuit diagrams of other configurations in which the damping force generating apparatus 20 and the solenoid 40 are adopted. In addition, the same reference numerals are assigned to the same components as the hydraulic circuit shown in FIG. 9, and the overlapping descriptions are omitted or simplified. In FIGS.

10 to 13, the flow of the oil at the time of the compression side stroke is indicated by a solid line, and the flow of the oil at the time of the extension side stroke is indicated by a dashed line.

Figure 10:
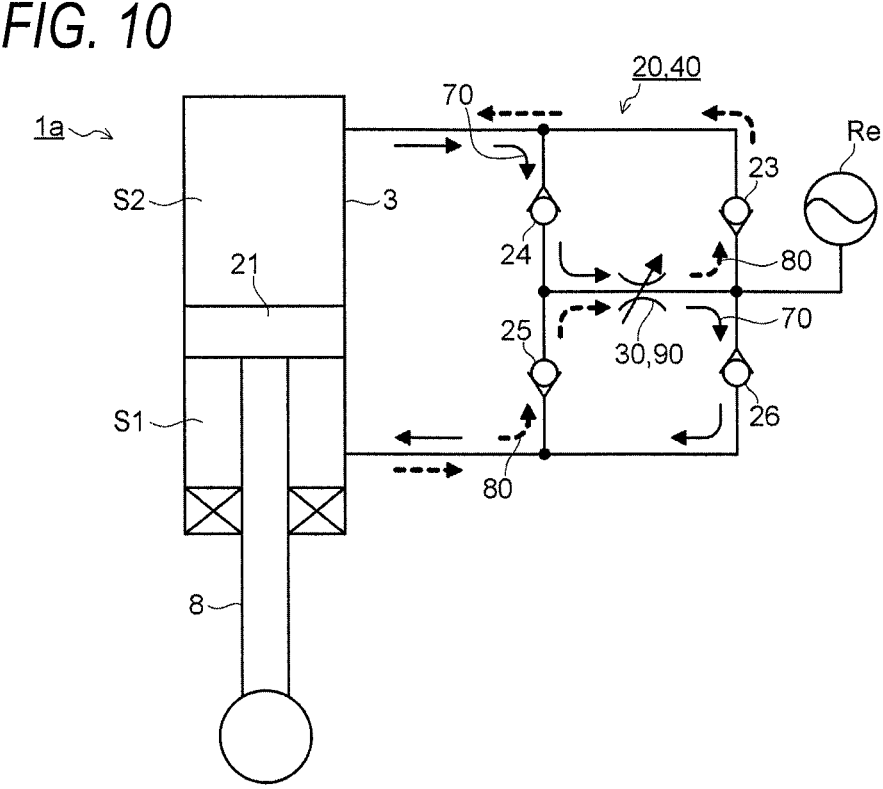
FIG. 10 is a hydraulic circuit diagram having another configuration in the shock absorber in the present embodiment.

Hydraulic Circuit of FIG. 10

As shown in FIG. 10, the hydraulic circuit includes the main valve 30, the pilot flow path 90, the compression side inlet check valve 24, the compression side outlet check valve 26, the extension side inlet check valve 25, the extension side outlet check valve 23, and the oil reservoir chamber Re.

In addition, in this hydraulic circuit, the damping force generating apparatus 20 and the oil reservoir chamber Re are provided outside the piston 21 and the inner tube 3 in which the piston 21 slides. The oil reservoir chamber Re has the function that the oil is supplied and is discharged by an amount corresponding to a volume of the piston rod 8 inserted into and retreated from the inner tube 3. For example, the oil reservoir chamber Re may include a bag-shaped bladder in which an inner portion is filled with gas, or the like.

The oil reservoir chamber Re communicates with an oil path which is branched at a downstream sides of the main valve 30 and the pilot flow path 90. In this way, by branching the oil path which communicates with the oil reservoir chamber Re at the downstream sides of the main valve 30 and the pilot flow path 90, the oil after being dampened by the main valve 30 is introduced into the oil reservoir chamber Re.

2-1 Compression Side Stroke

When a wheel moves up and down by following irregularity of a road surface during traveling of the motorcycle, the shock absorber 1a which suspends the wheel extends and contracts. In the compression side stroke in which the piston rod 8 relatively moves up with respect to the inner tube 3, the oil inside the piston side oil chamber S2 is compressed by the piston 21, and the pressure in the piston side oil chamber S2 increases. And then, the oil inside the piston side oil chamber S2 is introduced into the damping force generating apparatus 20.

The oil introduced into the damping force generating apparatus 20 flows into the rod side oil chamber S1 through the main flow path 70 at the time of the compression side stroke. This time, the compression side damping force is generated in the shock absorber 1a by the flow resistance when the oil passes through the main valve 30. Here, the location at which the main flow path 70 and the pilot flow path 90 join each other as shown in FIGS. 3 and 6 corresponds to the location at which the reference numerals of the main valve 30 and the pilot flow path 90 are described in the hydraulic circuit shown in FIG. 10.

2-2 Extension Side Stroke

In the extension side stroke in which the piston rod 8 relatively moves down with respect to the inner tube 3, the piston 21 moves down in the inner tube 3 along with the piston rod 8. Accordingly, the oil inside the rod side oil chamber S1 is compressed by the piston 21, and the pressure in the rod side oil chamber S1 increases. And then, the oil inside the rod side oil chamber S1 is introduced into the damping force generating apparatus 20.

The oil introduced into the damping force generating apparatus 20 flows into the piston side oil chamber S2 through the main flow path 80 at the time of the extension side stroke. This time, the extension side damping force is generated in the shock absorber 1a by the flow resistance when the oil passes through the main valve 30. Here, the location at which the main flow path 70 and the pilot flow path 90 join each other as shown in FIGS. 3 and 6 corresponds to a location at which the reference numerals of the main valve 30 and the pilot flow path 90 are described in the hydraulic circuit shown in FIG. 10.

Figure 11:
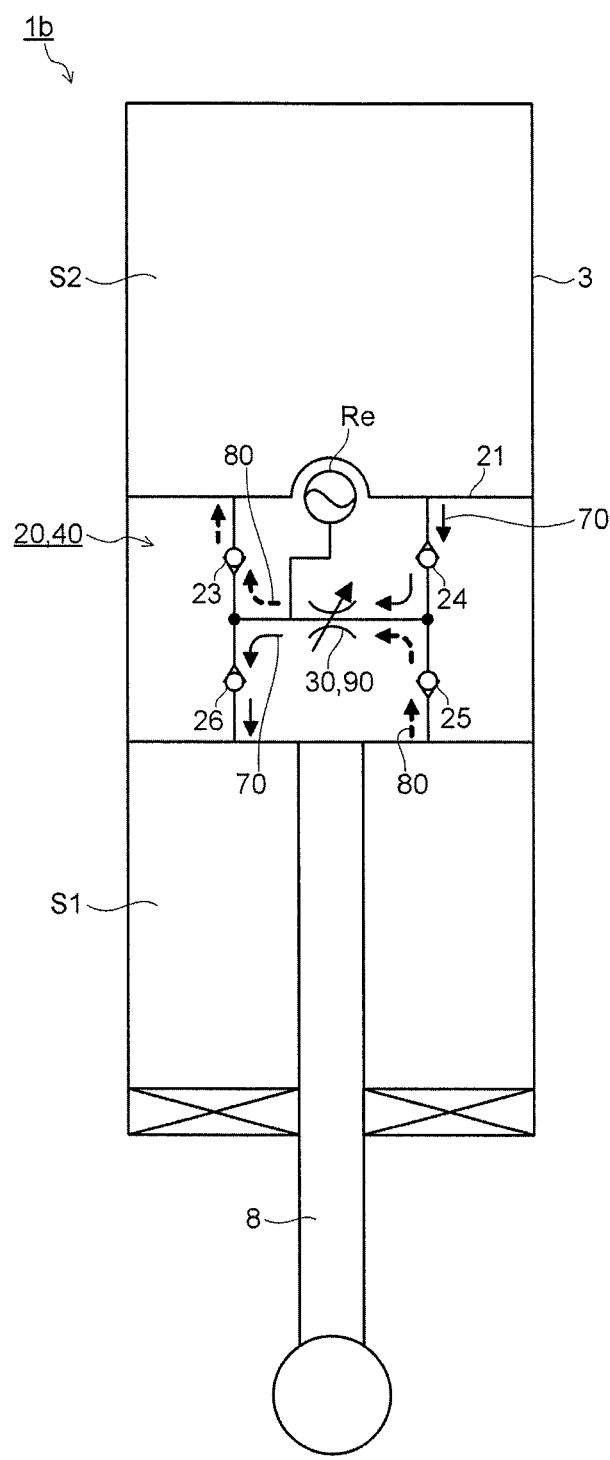
FIG. 11 is a hydraulic circuit diagram having still another configuration in the shock absorber in the present embodiment.

Hydraulic Circuit of FIG. 11

As shown in FIG. 11, the hydraulic circuit includes the main valve 30, the pilot flow path 90, the compression side inlet check valve 24, the compression side outlet check valve 26, the extension side inlet check valve 25, the extension side outlet check valve 23, and the oil reservoir chamber Re.

In this hydraulic circuit, the damping force generating apparatus 20 and the oil reservoir chamber Re are provided inside the piston 21 in the inner tube 3. In addition, the present invention is not limited to this, and the oil reservoir chamber Re may be provided outside the piston 21 in the inner tube 3. Moreover, the oil reservoir chamber Re may be provided in a vicinity of the axle side mounting member (not shown) or the axle side mounting member (not shown) from the flow path which penetrates the inner portion of the piston rod 8.

The oil reservoir chamber Re communicates with the oil path which is branched at the downstream sides of the main valve 30 and the pilot flow path 90. In this way, by branching the oil path which communicates with the oil reservoir chamber Re at the downstream sides of the main valve 30 and the pilot flow path 90, the oil after being dampened by the main valve 30 is introduced into the oil reservoir chamber Re.

3-1 Compression Side Stroke

The oil inside the piston side oil chamber S2, in which the piston rod 8 relatively moves up with respect to the inner tube 3 and the pressure increases, flows into the rod side oil chamber S1 through the main flow path 70 at the time of the compression side stroke. This time, the compression side damping force is generated in the shock absorber 1b by the flow resistance when the oil passes through the main valve 30. Here, the location at which the main flow path 70 and the pilot flow path 90 join each other as shown in FIGS. 3 and 6 corresponds to the location at which the reference numerals of the main valve 30 and the pilot flow path 90 are described in the hydraulic circuit shown in FIG. 11.

3-2 Extension Side Stroke

The oil inside the rod side oil chamber S1, in which the piston rod 8 relatively moves down with respect to the inner tube 3 and the pressure increases, flows into the piston side oil chamber S2 through the main flow path 80 at the time of the extension side stroke. This time, the extension side damping force is generated in the shock absorber 1b by the flow resistance when the oil passes through the main valve 30. Here, the location at which the main flow path 70 and the pilot flow path 90 join each other as shown in FIGS. 3 and 6 corresponds to a location at which the reference numerals of the main valve 30 and the pilot flow path 90 are described in the hydraulic circuit shown in FIG. 11.

Figure 12:
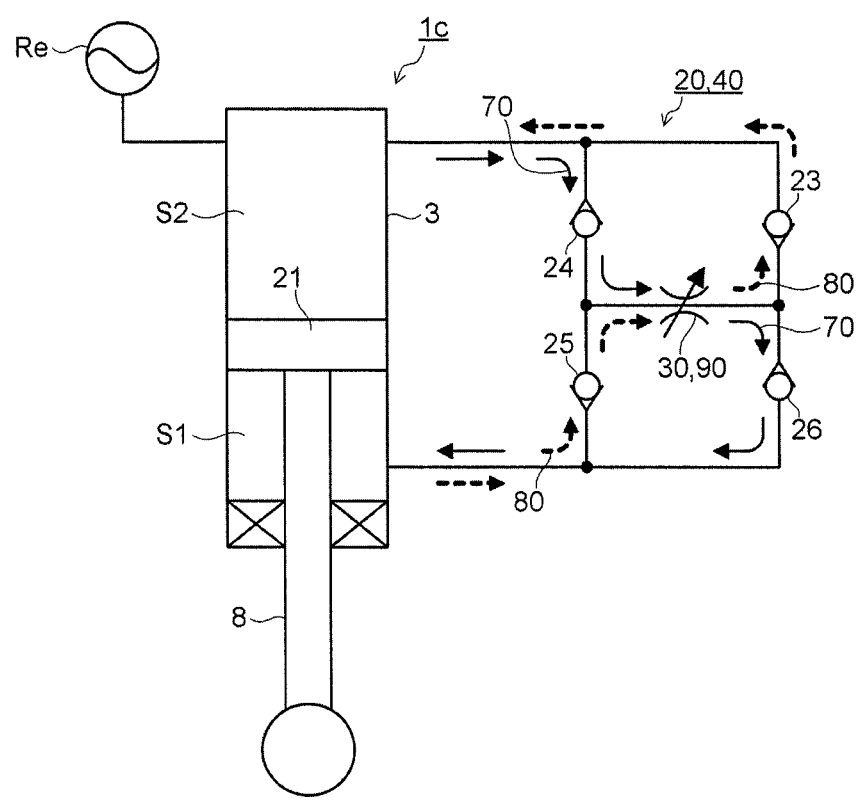
FIG. 12 is a hydraulic circuit diagram having still another configuration in the shock absorber in the present embodiment.

Hydraulic Circuit of FIG. 12

As shown in FIG. 12, the hydraulic circuit includes the main valve 30, the pilot flow path 90, the compression side inlet check valve 24, the compression side outlet check valve 26, the extension side inlet check valve 25, the extension side outlet check valve 23, and the oil reservoir chamber Re.

As shown in FIG. 12, the oil reservoir chamber Re is not provided to be juxtaposed with the damping force generating apparatus 20, and is provided to directly communicate with the piston side oil chamber S2. In addition, in this case, the damping force generating apparatus 20 and the oil reservoir chamber Re are provided outside the piston 21 and furthermore outside the inner tube 3. In addition, an amount of oil corresponding to the volume of the piston rod 8 inserted into the inner tube 3 is introduced into the oil reservoir chamber Re. In this connection, an orifice (not shown), a check valve (not shown), or the like is provided in the inlet of the oil reservoir chamber Re, and thus, the introduction amount of the oil is adjusted.

4-1 Compression Side Stroke

The oil inside the piston side oil chamber S2, in which the piston rod 8 relatively moves up with respect to the inner tube 3 and the pressure increases, is introduced to the damping force generating apparatus 20. In addition, a portion of the oil inside the piston side oil chamber S2 is introduced into the oil reservoir chamber Re. The amount of the oil introduced into the oil reservoir chamber Re corresponds to the volume of the piston rod 8 inserted into the inner tube 3. Accordingly, a change of the volume in the inner tube 3 according to the insertion of the piston rod 8 into the inner tube 3 is compensated.

The flow of the oil in the damping force generating apparatus 20 is the same as the flow described in the compression side stroke (2-1) except for the flow of the oil introduced into the oil reservoir chamber Re. Here, the location at which the main flow path 70 and the pilot flow path 90 join each other as shown in FIGS. 3 and 6 corresponds to the location at which the reference numerals of the main valve 30 and the pilot flow path 90 are described in the hydraulic circuit shown in FIG. 12.

4-2 Extension Side Stroke

The oil inside the rod side oil chamber S1, in which the piston rod 8 relatively moves down with respect to the inner tube 3 and the pressure increases, is introduced to the damping force generating apparatus 20. In addition, the oil inside the oil reservoir chamber Re is supplied to the piston side oil chamber S2. Accordingly, the change of the volume in the inner tube 3 according to the retreat of the piston rod 8 from the inner tube 3 is compensated.

The flow of the oil in the damping force generating apparatus 20 is the same as the flow described in the extension side stroke (2-2) except for the flow of the oil derived from the oil reservoir chamber Re. Here, the location at which the main flow path 70 and the pilot flow path 90 join each other as shown in FIGS. 3 and 6 corresponds to a location at which the reference numerals of the main valve 30 and the pilot flow path 90 are described in the hydraulic circuit shown in FIG. 12.

Figure 13:
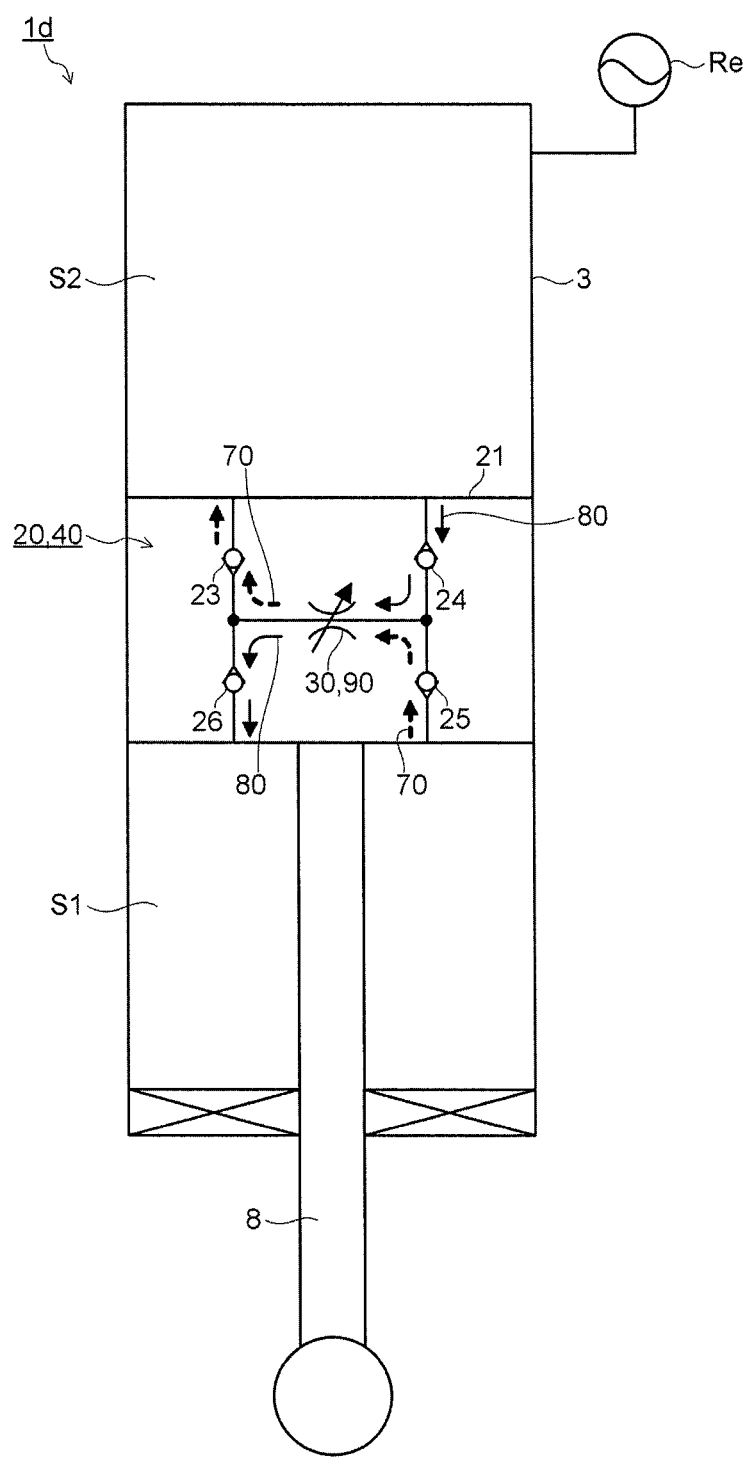
FIG. 13 is a hydraulic circuit diagram having still another configuration in the shock absorber in the present embodiment.
Figure 14:
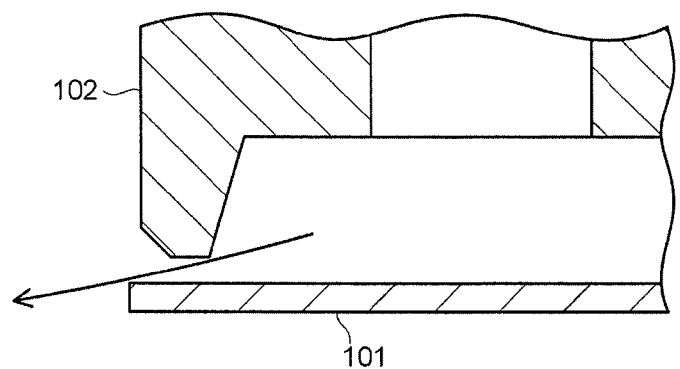
FIG. 14 is a vertical cross-sectional diagram of a main portion of a damping force adjusting apparatus in a hydraulic shock absorber suggested in Patent Literature 1.
Figure 15:
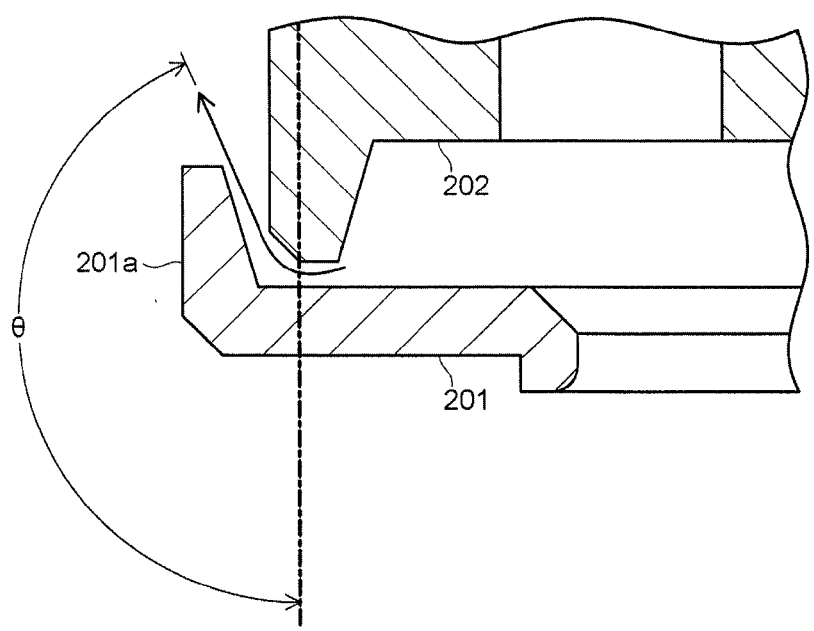
FIG. 15 is a vertical cross-sectional diagram of a main portion of a damping force adjusting apparatus in a hydraulic shock absorber suggested in Patent Literature 2.

Hydraulic Circuit of FIG. 13

As shown in FIG. 13, the hydraulic circuit includes the main valve 30, the pilot flow path 90, the compression side inlet check valve 24, the compression side outlet check valve 26, the extension side inlet check valve 25, the extension side outlet check valve 23, and the oil reservoir chamber Re.

In the hydraulic circuit of this embodiment, the function of the hydraulic circuit is provided together in the piston 21. That is, the damping force generating apparatus 20 in which the oil reservoir chamber Re is not juxtaposed is provided inside the piston 21 in the inner tube 3. In this connection, the oil reservoir chamber Re is provided outside the piston 21 and furthermore outside the inner tube 3 in which the piston 21 slides.

This hydraulic circuit is the same as the hydraulic circuit shown in FIG. 11 except that the oil reservoir chamber Re is not provided inside the piston 21. In addition, the configuration of the oil reservoir chamber Re is the same as the configuration of the oil reservoir chamber Re shown in FIG. 12.

5-1 Compression Side Stroke

The specific flow of the oil is the same as the flow described in the compression side stroke (3-1) except for the flow of the oil introduced into the oil reservoir chamber Re. Here, the location at which the main flow path 70 and the pilot flow path 90 join each other as shown in FIGS. 3 and 6 corresponds to a location at which the reference numerals of the main valve 30 and the pilot flow path 90 are described in the hydraulic circuit shown in FIG. 13.

In addition, a portion of the oil inside the piston side oil chamber S2 is introduced into the oil reservoir chamber Re. The amount of the oil introduced into the oil reservoir chamber Re corresponds to the volume of the piston rod 8 inserted into the inner tube 3. Accordingly, the change of the volume in the inner tube 3 according to the insertion of the piston rod 8 into the inner tube 3 is compensated.

5-2 Extension Side Stroke

The specific flow of the oil is the same as the flow described in the extension side stroke (3-2) except for the flow of the oil introduced out from the oil reservoir chamber Re. Here, the location at which the main flow path 70 and the pilot flow path 90 join each other as shown in FIGS. 3 and 6 corresponds to a location at which the reference numerals of the main valve 30 and the pilot flow path 90 are described in the hydraulic circuit shown in FIG. 13.

In addition, the oil inside the oil reservoir chamber Re is supplied to the piston side oil chamber S2. Accordingly, the change of the volume in the inner tube 3 according to the retreat of the piston rod 8 from the inner tube 3 is compensated.

Also in the shock absorbers 1a, 1b, 1c and 1d including the hydraulic circuits having other configurations shown in FIGS. 10 to 13, since the back pressure of the pilot chamber 31 is controlled using the jet stream of the oil passing through the main valve 30 of the main flow path 70, it is possible to obtain the effects similar to those of the shock absorbers 1 shown in the first to third embodiments.

Moreover, in the shock absorbers 1b and 1d including the hydraulic circuits having other configurations shown in FIGS. 11 and 13, the damping force generating apparatus 20 and the solenoid 40 are provided inside the piston 21. Accordingly, the damping force generating apparatus 20 and the solenoid 40 are compactly incorporated to the piston 21, and thus, for example, it is possible to use the shock absorbers 1b and 1d as the front fork or the rear cushion by which the wheel of the motorcycle is suspended to the vehicle body.

In addition, in the shock absorbers 1a and 1c including the hydraulic circuits having other configurations shown in FIGS. 10 and 12, the damping force generating apparatus 20 and the solenoid 40 are provided outside the piston 21. Accordingly, by disposing the damping force generating apparatus 20 and the solenoid 40 outside the piston 21, it is possible to dispose the damping force generating apparatus 20 and the solenoid 40 at free positions, and it is possible to increase a degree of freedom of a layout. Therefore, it is possible to increase the degree of freedom of the layout with respect to the disposition of the solenoid 40 which is the actuator, and the wiring of a harness or the like.

In addition, hereinbefore, the case where the present invention is applied to the inverted shock absorber in which the outer tube is attached to the vehicle body side and the inner tube is attached to the axle side is described. However, the present invention may be also applied to an upright shock absorber in which the inner tube is attached to the vehicle body side and the outer tube is attached to the axle side.

In addition, hereinbefore, the case where the present invention is applied to the shock absorber which is used as the front fork by which the front wheel of the motorcycle is suspended to the vehicle body is described. However, for example, the configuration shown in each hydraulic circuit may be applied to the shock absorber which is used as the rear cushion by which the rear wheel of the motorcycle is suspended to the vehicle body. In addition, the present invention may be similarly applied to a shock absorber by which wheels of arbitrary vehicles other than the motorcycle are suspended.

What is claimed is:

1. A shock absorber comprising:
a cylinder in which a working fluid is enclosed;
a piston which is slidably fitted in the cylinder;
a piston rod which is connected to the piston and extends outside the cylinder; and
a damping force generating apparatus which generates a damping force by controlling a flow of the working fluid caused by sliding of the piston in the cylinder,
wherein the damping force generating apparatus includes:
a main flow path through which the working fluid flows by the sliding of the piston in the cylinder;
a main valve which generates the damping force by controlling the flow of the working fluid by opening and closing the main flow path;
a bypass flow path which is branched from the main flow path or is provided on the main valve;
a pilot chamber into which the working fluid flows via the bypass flow path and which applies an internal pressure in a valve closing direction to the main valve by a pressure of the working fluid; and
a pilot flow path to which the working fluid flows out from the pilot chamber,
wherein a jet stream which is generated in a flow path narrowed by the main valve in the main flow path joins the flow of the working fluid which flows out from the pilot chamber via the pilot flow path, and
the flow of the working fluid flowing out from the pilot chamber via the pilot flow path joins the jet stream in a direction opposite to a flow of the jet stream flowing through the main flow path.

2. The shock absorber according to claim 1, further comprising:
a shielding member which shields at least one of the flow of the working fluid flowing out from the pilot chamber via the pilot flow path and the flow of the jet stream flowing through the main flow path,
wherein the shielding member is provided in a location at which the flow of the working fluid flowing out from the pilot chamber via the pilot flow path joins the jet stream flowing through the main flow path.

3. The shock absorber according to claim 1, further comprising:
a flow changing member which changes a direction of at least one of the flow of the working fluid flowing out from the pilot chamber via the pilot flow path and the flow of the jet stream flowing through the main flow path,
wherein the flow changing member is provided in a location at which the flow of the working fluid flowing out from the pilot chamber via the pilot flow path joins the jet stream flowing through the main flow path.

4. The shock absorber according to claim 1, wherein the damping force generating apparatus is provided inside the piston.

5. The shock absorber according to claim 1, wherein the damping force generating apparatus is provided outside the piston.

6. The shock absorber according to claim 1, further comprising:
a shielding member which shields at least one of the flow of the working fluid flowing out from the pilot chamber via the pilot flow path and the flow of the jet stream flowing through the main flow path,
a flow changing member which changes a direction of at least one of the flow of the working fluid flowing out from the pilot chamber via the pilot flow path and the flow of the jet stream flowing through the main flow path,
wherein the shielding member is provided in a location at which the flow of the working fluid flowing out from the pilot chamber via the pilot flow path joins the jet stream flowing through the main flow path, and
wherein the flow changing member is provided in a location at which the flow of the working fluid flowing out from the pilot chamber via the pilot flow path joins the jet stream flowing through the main flow path.

7. The shock absorber according to claim 1, further comprising:
a shielding member which shields at least one of the flow of the working fluid flowing out from the pilot chamber via the pilot flow path and the flow of the jet stream flowing through the main flow path,
a flow changing member which changes a direction of at least one of the flow of the working fluid flowing out from the pilot chamber via the pilot flow path and the flow of the jet stream flowing through the main flow path,
wherein the shielding member is provided in a location at which the flow of the working fluid flowing out from the pilot chamber via the pilot flow path joins the jet stream flowing through the main flow path,
wherein the flow changing member is provided in a location at which the flow of the working fluid flowing out from the pilot chamber via the pilot flow path joins the jet stream flowing through the main flow path, and
wherein the damping force generating apparatus is provided inside the piston.

8. The shock absorber according to claim 1, further comprising:
a shielding member which shields at least one of the flow of the working fluid flowing out from the pilot chamber via the pilot flow path and the flow of the jet stream flowing through the main flow path,
a flow changing member which changes a direction of at least one of the flow of the working fluid flowing out from the pilot chamber via the pilot flow path and the flow of the jet stream flowing through the main flow path,
wherein the shielding member is provided in a location at which the flow of the working fluid flowing out from the pilot chamber via the pilot flow path joins the jet stream flowing through the main flow path,
wherein the flow changing member is provided in a location at which the flow of the working fluid flowing out from the pilot chamber via the pilot flow path joins the jet stream flowing through the main flow path, and
wherein the damping force generating apparatus is provided outside the piston.

9. A shock absorber comprising:
a cylinder in which a working fluid is enclosed;
a piston which is slidably fitted in the cylinder;
a piston rod which is connected to the piston and extends outside the cylinder; and a damping force generating apparatus which generates a damping force by controlling a flow of the working fluid caused by sliding of the piston in the cylinder, wherein the damping force generating apparatus includes:
- a main flow path through which the working fluid flows by the sliding of the piston in the cylinder;
- a main valve which generates the damping force by controlling the flow of the working fluid by opening and closing the main flow path;
- a bypass flow path which is branched from the main flow path or is provided on the main valve;
- a pilot chamber into which the working fluid flows via the bypass flow path and which applies an internal pressure in a valve closing direction to the main valve by a pressure of the working fluid; and
- a pilot flow path to which the working fluid flows out from the pilot chamber, wherein a jet stream, which is generated by narrowing the entire main flow path or a partial flow path of the main flow path other than a location at which the main valve is included, joins the flow of the working fluid which flows out from the pilot chamber via the pilot flow path, and the flow of the working fluid flowing out from the pilot chamber via the pilot flow path joins the jet stream in a direction opposite to a flow of the jet stream flowing through the main flow path.

10. The shock absorber according to claim 9, further comprising:
a shielding member which shields at least one of the flow of the working fluid flowing out from the pilot chamber via the pilot flow path and the flow of the jet stream flowing through the main flow path, wherein the shielding member is provided in a location at which the flow of the working fluid flowing out from the pilot chamber via the pilot flow path joins the jet stream flowing through the main flow path.

11. The shock absorber according to claim 9, further comprising:
a flow changing member which changes a direction of at least one of the flow of the working fluid flowing out from the pilot chamber via the pilot flow path and the flow of the jet stream flowing through the main flow path, wherein the flow changing member is provided in a location at which the flow of the working fluid flowing out from the pilot chamber via the pilot flow path joins the jet stream flowing through the main flow path.

12. The shock absorber according to claim 9,
wherein the damping force generating apparatus is provided inside the piston.

13. The shock absorber according to claim 9,
wherein the damping force generating apparatus is provided outside the piston.

14. The shock absorber according to claim 9, further comprising:
a shielding member which shields at least one of the flow of the working fluid flowing out from the pilot chamber via the pilot flow path and the flow of the jet stream flowing through the main flow path, a flow changing member which changes a direction of at least one of the flow of the working fluid flowing out from the pilot chamber via the pilot flow path and the flow of the jet stream flowing through the main flow path, wherein the shielding member is provided in a location at which the flow of the working fluid flowing out from the pilot chamber via the pilot flow path joins the jet stream flowing through the main flow path, and wherein the flow changing member is provided in a location at which the flow of the working fluid flowing out from the pilot chamber via the pilot flow path joins the jet stream flowing through the main flow path.

15. The shock absorber according to claim 9, further comprising:
a shielding member which shields at least one of the flow of the working fluid flowing out from the pilot chamber via the pilot flow path and the flow of the jet stream flowing through the main flow path, a flow changing member which changes a direction of at least one of the flow of the working fluid flowing out from the pilot chamber via the pilot flow path and the flow of the jet stream flowing through the main flow path, wherein the shielding member is provided in a location at which the flow of the working fluid flowing out from the pilot chamber via the pilot flow path joins the jet stream flowing through the main flow path, wherein the flow changing member is provided in a location at which the flow of the working fluid flowing out from the pilot chamber via the pilot flow path joins the jet stream flowing through the main flow path, and wherein the damping force generating apparatus is provided inside the piston.

16. The shock absorber according to claim 9, further comprising:
a shielding member which shields at least one of the flow of the working fluid flowing out from the pilot chamber via the pilot flow path and the flow of the jet stream flowing through the main flow path, a flow changing member which changes a direction of at least one of the flow of the working fluid flowing out from the pilot chamber via the pilot flow path and the flow of the jet stream flowing through the main flow path, wherein the shielding member is provided in a location at which the flow of the working fluid flowing out from the pilot chamber via the pilot flow path joins the jet stream flowing through the main flow path, wherein the flow changing member is provided in a location at which the flow of the working fluid flowing out from the pilot chamber via the pilot flow path joins the jet stream flowing through the main flow path, and wherein the damping force generating apparatus is provided outside the piston.

\* \* \* \* \*